US010356758B2

(12) United States Patent
Pan et al.

(10) Patent No.: US 10,356,758 B2
(45) Date of Patent: Jul. 16, 2019

(54) METHOD AND APPARATUS FOR REQUESTING AND MODIFYING RESOURCE CONFIGURATION IN A WIRELESS COMMUNICATION SYSTEM

(71) Applicant: ASUSTek Computer Inc., Taipei (TW)

(72) Inventors: Li-Te Pan, Taipei (TW); Wei-Yu Chen, Taipei (TW); Richard Lee-Chee Kuo, Taipei (TW)

(73) Assignee: ASUSTek Computer Inc., Taipei (TW)

(*) Notice: Subject to any disclaimer, the term of this patent is extended or adjusted under 35 U.S.C. 154(b) by 60 days.

(21) Appl. No.: 15/674,871

(22) Filed: Aug. 11, 2017

(65) Prior Publication Data

US 2018/0132208 A1    May 10, 2018

Related U.S. Application Data

(60) Provisional application No. 62/373,596, filed on Aug. 11, 2016, provisional application No. 62/402,342, filed on Sep. 30, 2016.

(51) Int. Cl.
*H04W 4/00* (2018.01)
*H04W 72/04* (2009.01)
(Continued)

(52) U.S. Cl.
CPC ............ *H04W 72/04* (2013.01); *H04W 4/06* (2013.01); *H04W 4/46* (2018.02); *H04W 72/005* (2013.01); *H04W 72/0406* (2013.01)

(58) Field of Classification Search
CPC ......... H04W 72/04; H04W 4/46; H04W 4/06; H04W 72/005; H04W 72/0406;
(Continued)

(56) References Cited

U.S. PATENT DOCUMENTS

2016/0285935 A1* 9/2016 Wu .................... H04W 4/90
2016/0295624 A1* 10/2016 Novlan ............. H04W 76/14
(Continued)

FOREIGN PATENT DOCUMENTS

CN    107277762 A  * 10/2017
CN    107612666 A  *  1/2018
(Continued)

OTHER PUBLICATIONS

ZTE: "SPS enhancements for V2V over PC5", 3GPP Draft; R2-163836 SPS Enhancements for V2V Over PC5, 3rd Generation Partnership Project (3GPP), Mobile Competence Centre; 650, Route Des Lucioles; F-06921 Sophia-Antipolis Cedex; France vol. RAN WG2, No. Nanjing, China; May 23, 2016-May 27, 2016 May 22, 2016 (May 22, 2016), XP051105236, Retrieved from the Internet: URL: http://www.3gpp.org/ftp/Meetings_3GPP_SYNC/RAN2/Docs/.
(Continued)

*Primary Examiner* — Mahendra Patel
(74) *Attorney, Agent, or Firm* — Blue Capital Law Firm, P.C.

(57) ABSTRACT

A method and apparatus are disclosed from the perspective of a UE for requesting SPS resources for V2X message transmissions in a wireless communication system. The method includes generating a first V2X message for transmission. In addition, the method includes transmitting a first signal to a network node for requesting SPS resources for transmitting the first V2X message and V2X messages which are generated subsequent to the first V2X message, wherein the first signal includes an identity used to associate the SPS resources with the first V2X message and the V2X messages. Furthermore, the method includes receiving a second signal from the network node, wherein the second signal contains a first information indicating the SPS resources and the identity. The method also includes trans-
(Continued)

mitting the first V2X message and the V2X messages according to the SPS resources indicated by the first information.

18 Claims, 25 Drawing Sheets

(51) Int. Cl.
  *H04W 4/06* (2009.01)
  *H04W 72/00* (2009.01)
  *H04W 4/46* (2018.01)

(58) Field of Classification Search
  CPC ... H04W 72/12; H04W 72/14; H04W 72/042; H04W 72/1263; H04W 84/005; H04W 72/00; H04L 29/08; H04L 67/42; H04L 67/18; H04L 67/12; G08G 1/22
  USPC ....... 370/329, 389; 455/502, 456.1; 375/143
  See application file for complete search history.

(56) References Cited

U.S. PATENT DOCUMENTS

| | | | |
|---|---|---|---|
| 2017/0019887 A1* | 1/2017 | Jiang | H04W 72/042 |
| 2017/0331577 A1* | 11/2017 | Parkvall | H04J 11/0079 |
| 2017/0331670 A1* | 11/2017 | Parkvall | H04W 52/0274 |
| 2018/0035276 A1* | 2/2018 | Kang | H04W 8/005 |
| 2018/0063852 A1* | 3/2018 | Kang | H04W 72/10 |
| 2018/0077633 A1* | 3/2018 | Chae | H04L 5/00 |
| 2018/0115960 A1* | 4/2018 | Sorrentino | H04W 72/042 |
| 2018/0124707 A1* | 5/2018 | Lee | H04W 52/10 |
| 2018/0139593 A1* | 5/2018 | Chun | H04W 4/12 |
| 2018/0213376 A1* | 7/2018 | Pinheiro | H04W 76/14 |
| 2018/0213499 A1* | 7/2018 | Lee | H04W 56/00 |
| 2018/0263052 A1* | 9/2018 | Xu | H04W 72/04 |
| 2018/0317066 A1* | 11/2018 | Xu | H04W 4/06 |
| 2018/0376485 A1* | 12/2018 | Kahtava | H04W 28/26 |
| 2019/0020986 A1* | 1/2019 | Lee | H04W 4/44 |
| 2019/0058980 A1* | 2/2019 | Zhang | H04L 1/00 |

FOREIGN PATENT DOCUMENTS

| | | | | |
|---|---|---|---|---|
| GB | 2552029 A | * | 1/2018 | H04L 67/42 |
| GB | 2552792 A | * | 2/2018 | H04W 72/02 |
| WO | WO-2016159712 A1 | * | 10/2016 | H04W 76/14 |

OTHER PUBLICATIONS

NTT Docomo et al: "(E)PDCCH for sidelink SPS configuration switching", 3GPP Draft; R1-165193 PDCCH for Sidelink SPS, 3rd Generation Partnership Project (3GPP), Mobile Competence Centre; 650, Route Des Lucioles; F-06921 Sophia-Antipolis Cedex; France vol. RAN WG1, No. Nanjing, China; May 23, 2016-May 27, 2016 May 2016 (May 14, 2016), XP051096220, Retrieved from the Internet:URL:http://www.3gpp.org/ftp/tsg_ran/WG1_RL1/TSGR1_85/Docs/.
ZTE: "SPS enhancements for V2X over Uu", 3GPP Draft; R2-163840 SPS Enhancements for V2X Over UU, 3rd Generation Partnership Project (3GPP), Mobile Competence Centre; 650, Route Des Lucioles; F-06921 Sophia-Antipolis Cedex; France vol. RAN WG2, No. Nanjing, China; May 23, 2016-May 27, 2016 May 22, 2016 (May 22, 2016), XP051105239, Retrieved from the Internet: URL:http://www.3gpp.org/ftp/Meetings_3GPP_SYNC/RAN2/Docs/.
Communication pursuant to Article 94(3) EPC from corresponding EP Application No. 17185965.5, dated Nov. 16, 2018.
ZTE: "SPS enhancements for V2V over PC5", 3GPP Draft; R2-163836 SPS Enhancements for V2V Over PC5, 3rd Generation Partnership Project (3GPP), Mobile Competence Centre; 650, Route Des Lucioles; F-06921 Sophia-Antipolis Cedex; France vol. RAN WG2, No. Nanjing, China; May 23, 2016-May 27, 2016 May 22, 2016 (May 22, 2016), XP051105236, Retrieved from the Internet: URL: http://www.3gpp.org/ftp/Meetings_3GPP_SYNC/RAN2/Docs/- [retrieved on May 22, 2016] * the whole document *.
Samsung: "Multiple SPS configuration support for SL", 3GPP Draft; R1-164762 Multiple SPS Configuration Support for SL, 3rd Generation Partnership Project (3GPP), Mobile Competence Centre; 650, Route Des Lucioles; F-06921 Sophia-Antipolis Cedex; France, vol. Ran WG1, No. Nanjing; May 23, 2016-May 27, 2016, May 13, 2016 (May 13, 2016), XP051096711, Retrieved from the Internet: URL:http://www.3gpp.org/ftp/tsg_ran/WG1_RL1/TSGR1_85/Docs/ [retrieved on May 13, 2016].
Qualcomm Incorporated: "SPS for V2V Communication", 3GPP Draft; R2-164063 SPS for V2V Communication, 3rd Generation Partnership Project (3GPP), Mobile Competence Centre; 650, Route Des Lucioles; F-06921 Sophia-Antipolis Cedex; France, vol. RAN WG2, No. Nanjing, China; May 23, 2016-May 27, 2016 May 13, 2016 (May 13, 2016), XP051O95613, Retrieved from the Internet: URL:http://www.3gpp.org/ftp/tsg_ran/WG2_RL2/TSGR2_94/Docs/ [retrieved on May 13, 2016] * the whole document *.
NTT Docomo et al: "(E)PDCCH for sidelink SPS configuration switching", 3GPP Draft; R1-165193 PDCCH for Sidelink SPS, 3rd Generation Partnership Project (3GPP), Mobile Competence Centre; 650, Route Des Lucioles; F-06921 Sophia-Antipolis Cedex; France vol. RAN WG1, No. Nanjing, China; May 23, 2016-May 27, 2016 May 2016 (May 14, 2016), XP051096220, Retrieved from the Internet:URL:http://www.3gpp.org/ftp/tsg_ran/WG1_RL1/TSGR1_85/Docs/ [retrieved on May 14, 2016] * the whole document *.
European Search Report from corresponding EP Patent Application No. 17185965.5, dated Dec. 14, 2017.

* cited by examiner

| QCI | Resource Type | Priority Level | Packet Delay Budget | Packet Error Loss Rate | Example Services |
|---|---|---|---|---|---|
| 75 | GBR | 1.8 | 50 ms | $10^{-2}$ | V2X messages |
| 79 | Non-GBR | 5.8 | 50 ms | $10^{-2}$ | V2X messages |

FIG. 10 (PRIOR ART)

| Field name | | Length (octets) | Value (hex) | Description |
|---|---|---|---|---|
| WSMP Version | | 1 | 02 | The version of the WSM protocol |
| Provider Service Identifier | | 3 | C0 03 05 | PSID: C0-03-05 |
| WSM extension fields | Channel Number | 3 | 0F 01 AC | WAVE Element ID = 15<br>Length = 1<br>Channel: 172 |
| | DataRate | 3 | 10 01 0C | WAVE Element ID = 16<br>Length = 1<br>Data rate: 6 Mb/s |
| | Transmit Power Used | 3 | 04 01 1E | WAVE Element ID = 4<br>Length = 1<br>30 dBm |
| WAVE Element ID | | 1 | 80 | WAVE Short Message, per Annex E |
| WSMLength | | 2 | 00 0D | Indicates the length in octets (13) of the following WSMData field |
| WSMData | | 13 | 48 65 6C 6C 6F 20 57 6F 72 6C 64 21 00 | ASCII content: 'Hello World!'<br>0x48 = H<br>0x65 = e<br>0X6C = l<br>etc. |

FIG. 11 (PRIOR ART)

Content of UE Assistance Info

SPS index1: SPS interval 1, offset 1

Content of SL BSR

| Destination index 1 (CAM) | LCG x | Buffer Size X |
|---|---|---|
| Buffer Size X | Destination index 2 (DENM) ||
| LCG y | Buffer Size Y ||

Content of *SidelinkUEInformation*

Destination ID1 (Destination index1): SPS interval 1, offset 1
Destination ID2 (Destination index2): SPS interval 2, offset 2

Content of SL BSR

| Destination index 1 (CAM) | LCG 1 | Buffer Size X |
|---|---|---|
| Buffer Size X | Destination index 2 (DENM) | |
| LCG 1 | Buffer Size Y | |

Content of UE Assistance Info

Destination index1: SPS interval 1, offset 1

Content of SL BSR

| Destination index 1 (CAM) | | LCG 1 | Buffer Size X |
|---|---|---|---|
| Buffer Size X | | Destination index 2 (DENM) | |
| LCG 1 | Buffer Size Y | | |

Content of UE Assistance Info

Destination index1: SPS interval X, offset X (CAM)
Destination index2: SPS interval Y, offset Y (DENM1)
Destination index2: SPS interval Z, offset Z (DENM2)

Content of SL BSR

| Destination index 2 | LCG 1 | Buffer Size |
|---|---|---|
| Buffer Size (DENM1+DENM2) | ... | |
| ... | ... | |

Content of UE Assistance Info

Destination index1: SPS interval X, offset X (CAM)
Destination index2: SPS interval Y, offset Y (DENM1)
Destination index3: SPS interval Z, offset Z (DENM2)

Content of SL BSR

| Destination index 2 (DENM1) | | LCG 1 | Buffer Size Y |
|---|---|---|---|
| Buffer Size Y | | Destination index 3 (DENM2) | |
| LCG 1 | Buffer Size Z | | |

Content of UE Assistance Info

SPS index1: SPS interval 1, offset 1, destination index 1, LCG 0 (CAM)
SPS index2: SPS interval 2, offset 2, destination index 2, LCG 0 (DENM1)
SPS index3: SPS interval 2, offset 2, destination index 2, LCG 1 (DENM2)

Content of SL BSR

| Destination index 2 | LCG 0 (DENM1) | Buffer Size X |
|---|---|---|
| Buffer Size X | Destination index 2 | |
| LCG 1 (DENM2) | Buffer Size Y | |

METHOD AND APPARATUS FOR
REQUESTING AND MODIFYING
RESOURCE CONFIGURATION IN A
WIRELESS COMMUNICATION SYSTEM

CROSS-REFERENCE TO RELATED APPLICATIONS

The present Application claims the benefit of U.S. Provisional Patent Application Ser. No. 62/373,596 filed on Aug. 11, 2016 and U.S. Provisional Patent Application Ser. No. 62/402,342 filed on Sep. 30, 2016, the entire disclosures of which are incorporated herein in its entirety by reference.

FIELD

This disclosure generally relates to wireless communication networks, and more particularly, to a method and apparatus for requesting and modifying resource configuration in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a UE (User Equipment) for requesting semi-persistent scheduling (SPS) resources for V2X (Vehicle-to-Everything) message transmissions in a wireless communication system. The method includes generating a first V2X message for transmission. In addition, the method includes transmitting a first signal to a network node for requesting SPS resources for transmitting the first V2X message and following first V2X messages which are generated subsequent to the first V2X message, wherein the first signal includes an identity used to associate the SPS resources with the first V2X message and the following first V2X messages. Furthermore, the method includes receiving a second signal from the network node, wherein the second signal contains a first information indicating the SPS resources and the identity. The method also includes transmitting the first V2X message and the following first V2X messages according to the SPS resources indicated by the first information.

BRIEF DESCRIPTION OF THE DRAWINGS

FIG. 10 is a reproduction of Table 6.7.1-1 of 3GPP TR 23.785 v1.0.0.

FIG. 11 is a reproduction of FIG. 2 of 3GPP S2-162038.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards, including: ETSI TR 102.638 v1.1.1, entitled "ITS; Vehicular Communications; Basic Set of Applications; Definitions"; ETSI EN 302 637-2, entitled "ITS; Vehicular Communications; Basic Set of Applications; Part 2: Specification of Cooperative Awareness Basic Service"; ETSI EN 102 637-3 v1.1.1, entitled "ITS; Vehicular Communications; Part 3: Specifications of Decentralized Environmental Notification Basic Service"; and ETSI EN 302 637-3, entitled "ITS; Vehicular Communications; Part 3: Specifications of Decentralized Environmental Notification Basic Service". In addition, the exemplary wireless communication systems devices described below may be designed to support one or more standards such as the standard offered by a consortium named "3rd Generation Partnership Project" referred to herein as 3GPP, including: TS 22.185 v14.0.0, entitled "Service requirements for V2X services; Stage 1 (Release 14)"; S2-162038, entitled "Open issues and resolutions for PC5 based V2X", Qualcomm and LG Electronics; TR 36.885, entitled "Study on LTE-based V2X Services; (Release 14); TR 23.785 v1.0.0, entitled "Study on architecture enhancements for LTE support of V2X services (Release 14)"; TS 36.300 v13.3.0, entitled "E-UTRA and E-UTRAN; Overall description; Stage 2 (Release 13)"; TS 36.331 v13.1.0, entitled "E-UTRA; RRC; Protocol Specification (Release 13)"; TS 36.321 v 13.1.0, entitled "E-UTRA; MAC protocol specification (Release 13)"; RP-160649, entitled "Support for V2V services based on LTE sidelink", LG Electronics, Huawei, HiSilicon, CATT, and CATR; TS 23.303 v13.4.0, entitled "ProSe; Stage 2 (Release 13); 3GPP email discussion of [94#31] [LTE V2V] Layer 2 Open Issues for V2V; 3GPP RAN2#94 Chairman Notes; 3GPP RAN1#84bis Chairman's Notes; TS 23.285 v14.0.0, entitled "Architecture enhancements for V2X services (Release 14)"; and 3GPP RAN2#95 Chairman's Notes. The standards and documents listed above are hereby expressly incorporated by reference in their entirety.

Figure 1:
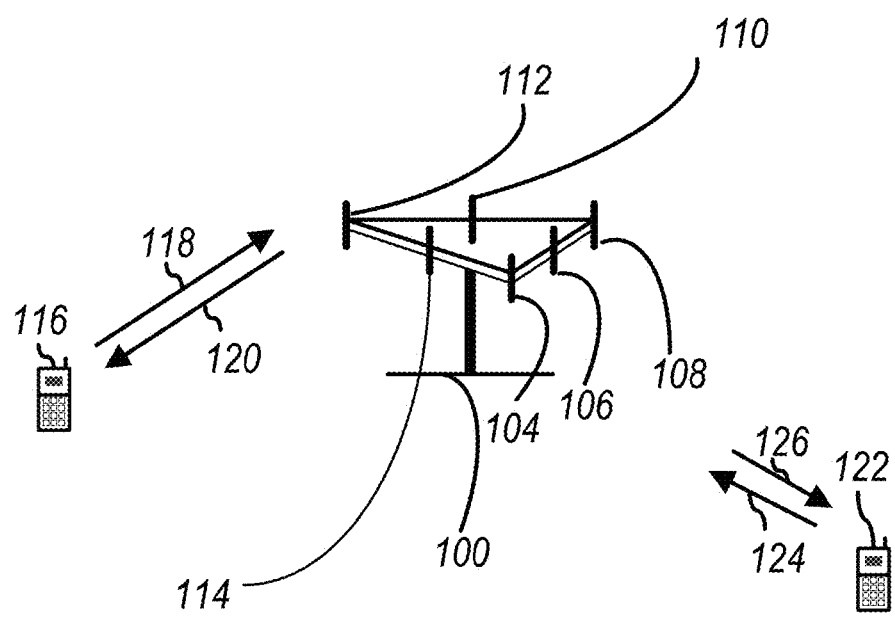
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
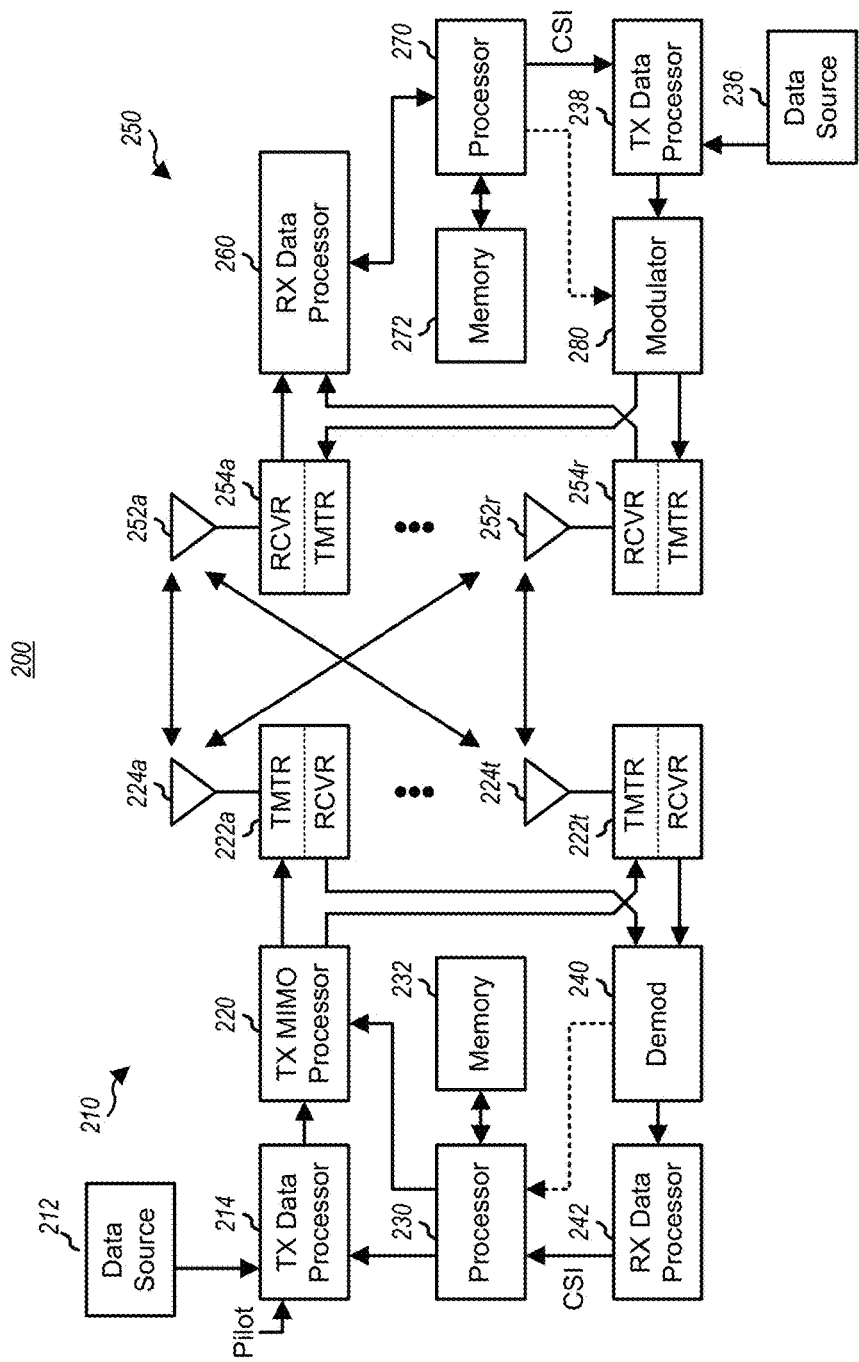
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
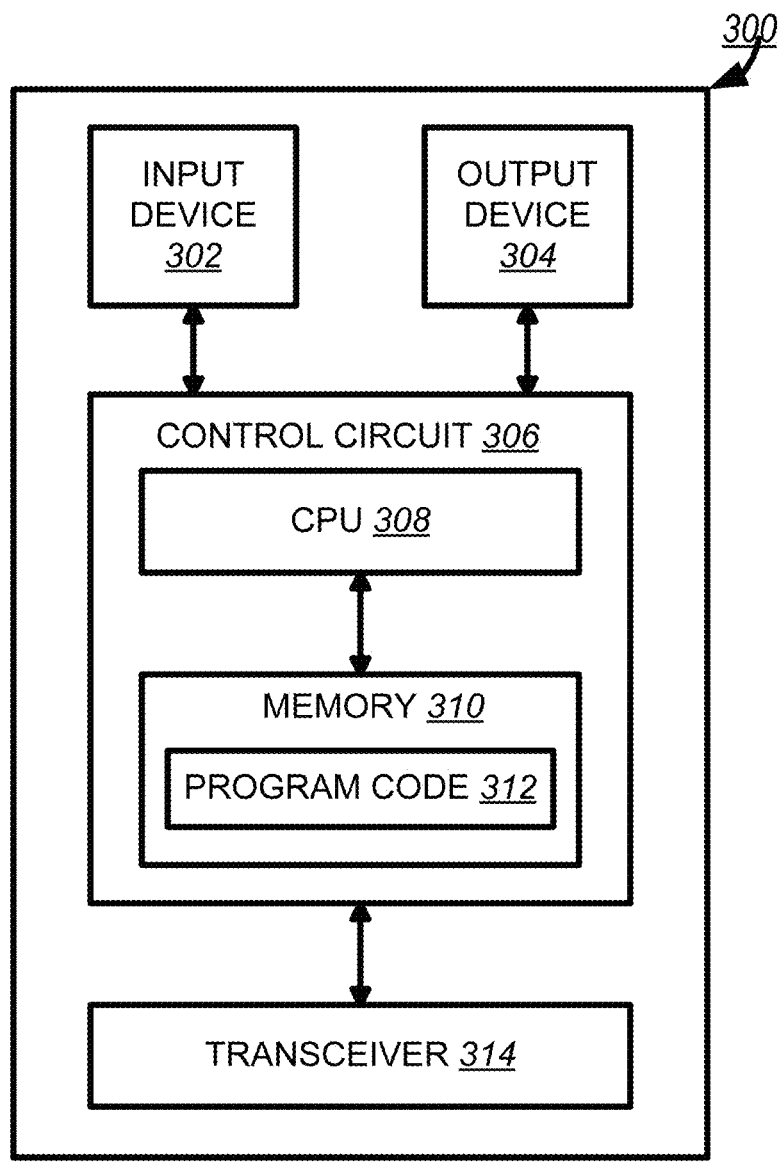
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
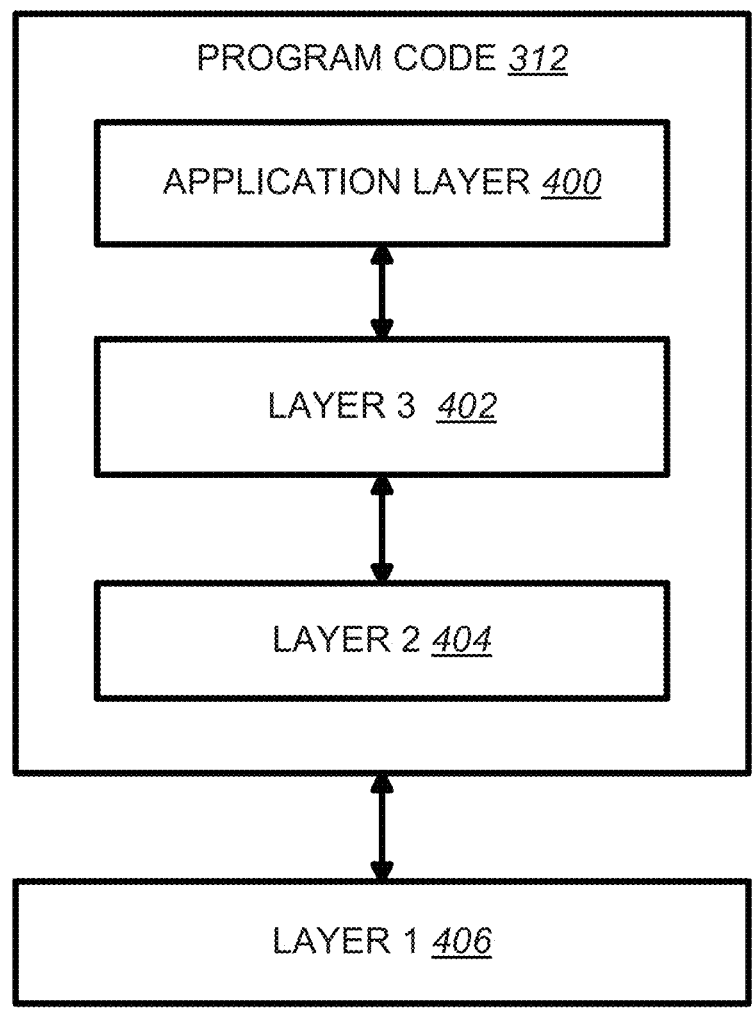
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

Figure 5:
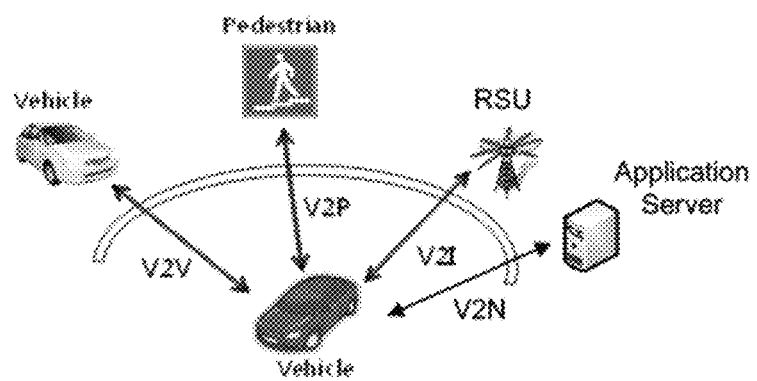
FIG. 5 is a reproduction of FIG. 4.1.1-1 of 3GPP TS 22.185 v14.0.0.

As discussed in 3GPP TS 22.185 and TR 36.885 and as illustrated in FIG. 5 (which is a reproduction of FIG. 4.1.1-1 of 3GPP TS 22.185 v14.0.0), the V2X (Vehicle-to-Everything) services include the following four different types:
Vehicle-to-Vehicle (V2V)
Vehicle-to-Infrastructure (V2I)
Vehicle-to-Network (V2N)
Vehicle-to-Pedestrian (V2P)

These four types of V2X applications can use "co-operative awareness" to provide more intelligent services for end-users. This means that entities, such as vehicles, roadside infrastructure, application server and pedestrians, can collect knowledge of their local environment (e.g., information received from other vehicles or sensor equipment in proximity) to process and share that knowledge in order to provide more intelligent services, such as cooperative collision warning or autonomous driving.

These intelligent transportation services and the associated message sets have been defined in automotive SDOs outside 3GPP. Three basic classes of applications for providing ITS services: road safety, traffic efficiency, and other applications can be found in, for example, ETSI TR 102.638. 3GPP only handles the transport of these messages to support different types of V2X applications. In general, the message transport expectations are described in requirements discussed in this specification.

Vehicle-to-Vehicle (V2V) application—V2V applications expect UEs that are in proximity of each other to exchange V2V application information. 3GPP transport of messages containing V2V application information requires the UE to have a valid subscription and authorization from a network operator. Transport for a valid subscriber is provided whether the UE is served or not served by E-UTRAN.

The UE supporting V2V applications transmits messages containing V2V application information (e.g., location, dynamics, and attributes). The message payloads may be flexible in order to accommodate varying amount of information.

Figure 6:
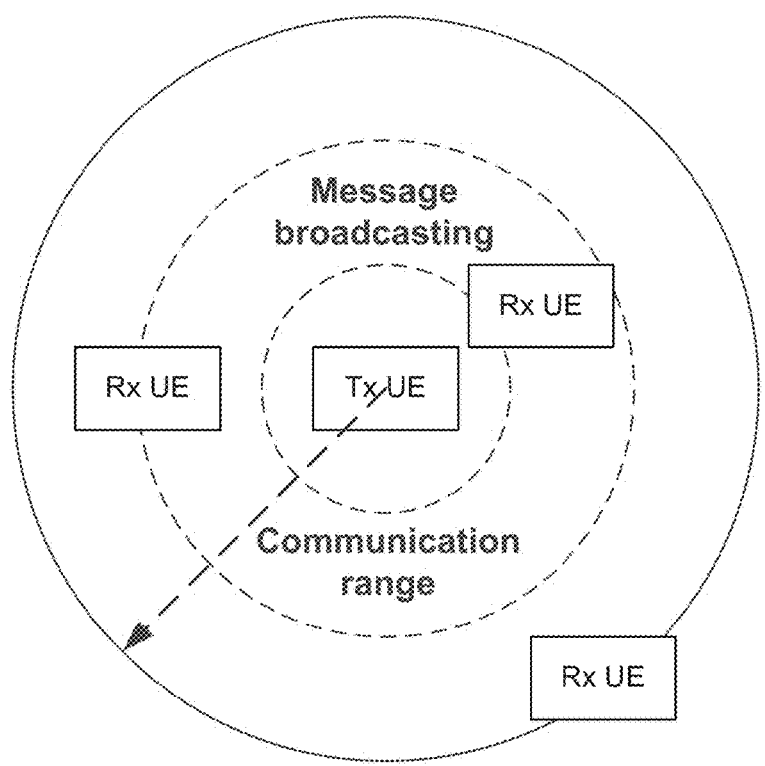
FIG. 6 is a reproduction of FIG. 4.1.2-1 of 3GPP TS 22.185 v14.0.0.

3GPP transport of message containing V2V application information is predominantly broadcast-based as illustrated in FIG. 6 (which is a reproduction of FIG. 4.1.2-1, entitled "Broadcast-based V2V communications", of 3GPP TS 22.185 v14.0.0). Such 3GPP transport includes the transport between UEs directly and/or, due to the limited direct communication range, the transport between UEs via infrastructure supporting V2X communication, e.g., RSU (Road Side Unit), application server, etc.

Vehicle-to-Infrastructure (V2I) application—The UE supporting V2I applications transmits messages containing V2I application information to an RSU. An RSU transmits messages containing V2I application information to one or more UEs supporting V2I applications.

Vehicle-to-Network (V2N) application—The UE supporting V2N applications communicates with an application server supporting V2N applications. Both parties communicate with each other via EPS. The application server and its location are out of 3GPP scope.

Vehicle-to-Pedestrian (V2P) Application—V2P applications expect UEs that are in proximity of each other to exchange V2P application information. 3GPP transport of messages containing V2P application information requires the UE to have a valid subscription and authorization from a network operator. Transport for a valid subscriber is provided whether the UE is served or not served by E-UTRAN.

The UE supporting V2P applications transmits messages containing V2P application information. It is expected that V2P application information can be transmitted either by a UE supporting V2X application in a vehicle (e.g., warning to pedestrian), or by a UE supporting V2X application associated with a vulnerable road user (e.g., warning to vehicle).

3GPP transport of messages containing V2P application information includes the transport between UEs directly and/or, due to the limited direct communication range, the transport between UEs via infrastructure supporting V2X communication, e.g., RSU, application server, etc.

Note: The main difference between 3GPP transport of messages with V2P and V2V application information is due to the properties of the UE. A UE supporting V2P applications used by pedestrian might, for example, have lower battery capacity, the radio sensitivity might be limited (e.g., due to antenna design), and therefore it may not be able to send messages with the same periodicity as UEs supporting V2V application, and/or receive messages.

CAM (Co-operative Awareness Message)—ETSI EN 302.637-2 provides the following general description:

Introduction

Cooperative awareness within road traffic means that road users and roadside infrastructure are informed about each other's position, dynamics and attributes. Road users are all kind of road vehicles like cars, trucks, motorcycles, bicycles or even pedestrians and roadside infrastructure equipment including road signs, traffic lights or barriers and gates. The awareness of each other is the basis for several road safety and traffic efficiency applications with many use cases as described in ETSI TR 102 638 [i.1]. It is achieved by regular exchange of information among vehicles (V2V, in general all kind of road users) and between vehicles and road side infrastructure (V2I and I2V) based on wireless networks, called V2X network and as such is part of Intelligent Transport Systems (ITS).

The information to be exchanged for cooperative awareness is packed up in the periodically transmitted Cooperative Awareness Message (CAM). The construction, management and processing of CAMs is done by the Cooperative Awareness basic service (CA basic service), which is part of the facilities layer within the ITS communication architecture ETSI EN 302 665 [1] supporting several ITS applications.

The CA basic service is a mandatory facility for all kind of ITS-Stations (ITS-S), which take part in the road traffic (vehicle ITS-S, personal ITS-S, etc.). The present document focuses on the specifications for CAMs transmitted by all vehicle ITS-Ss participating in the V2X network. Nevertheless, the present document defines the CAM format with flexibility in order to be easily extendable for the support of other types of ITS-Ss or future ITS applications.

The requirements on the performance of the CA basic service, the content of the CAM and the quality of its data elements are derived from the Basic Set of Applications (BSA) as defined in ETSI TR 102 638 [i.1] and in particular from the road safety applications as defined in ETSI TS 101 539-1 [i.8], ETSI TS 101 539-2 [i.9], and ETSI TS 101 539-3 [i.10].

In general, CAM is to be received/utilized by at least a vehicle (V2V), RSU (V2I) or a pedestrian (V2P) that are capable of the ITS-S application.

CAM Generation Rules & Traffic Pattern—CAMs are generated based on the general protocol operation and passed to lower layers for transmission (as discussed in ETSI EN 302637-2).

General Protocol Operation:

ITS-S may execute the following operations:
1) set T_CheckCamGen and start the timer;
2) when the timer T_CheckGenCam expires, check the CAM generation conditions:
   a) if any of the condition is satisfied, continues the operation;
   b) if none of the condition is satisfied, skip step 3) to step 7);
3) collect data for mandatory containers;
4) check if optional containers are to be added for CAM generation:
   a) if yes, check the ITS-S type and ITS-S role and collect data for optional containers;
   b) if no, continue the operation;
5) encode CAM;
6) pass CAM to the ITS networking & transport layer;
7) save data required as specified in clause C.2.3 for next CAM generation;
8) restart the timer T_CheckCamGen.

CAM Generation Conditions:
1) The time elapsed since the last CAM generation is equal to or greater than T_GenCam_Dcc and one of the following ITS-S dynamics related conditions is given:
   1-1. the absolute difference between the current heading of the originating ITS-S and the heading included in the CAM previously transmitted by the originating ITS-S exceeds 4°;
   1-2. the distance between the current position of the originating ITS-S and the position included in the CAM previously transmitted by the originating ITS-S exceeds 4 m (60 km/h→240 ms, 120 km/h→120 ms);
   1-3. the absolute difference between the current speed of the originating ITS-S and the speed included in the CAM previously transmitted by the originating ITS-S exceeds 0.5 m/s($\approx$1.8 km/h).
2) The time elapsed since the last CAM generation is equal to or greater than T_GenCam and equal to or greater than T_GenCam_Dcc.

DENM (Decentralized Environmental Notification Message)—ETSI EN 302.637-3 provides the following general description:

Introduction

ITS use cases are distributed over multiple instances of ITS stations (ITS-S). ITS-Ss interact in the ITS networks to provide a large diversity of co-operating customer services that satisfy different types of functional and operational requirements.

ETSI TC ITS has defined a "Basic Set of Applications" (BSA) in ETSI TR 102 638 [i.1] that can be deployed within a three-year time frame after the completion of their standardization. In BSA, the Road Hazard Warning (RHW) application is composed of multiple use cases with the objective to improve road safety and traffic efficiency using vehicle-to-vehicle and vehicle-to-infrastructure communication technologies. ETSI TC ITS defines the decentralized environmental notification (DEN) basic service that supports the RHW application.

The DEN basic service is an application support facility provided by the facilities layer. It constructs, manages and processes the Decentralized Environmental Notification Message (DENM). The construction of a DENM is triggered by an ITS-S application. A DENM contains information related to a road hazard or an abnormal traffic conditions, such as its type and its position. The DEN basic service delivers the DENM as payload to the ITS networking & transport layer for the message dissemination. Typically for an ITS application, a DENM is disseminated to ITS-Ss that are located in a geographic area through direct vehicle-to-vehicle or vehicle-to-infrastructure communications. At the receiving side, the DEN basic service of an receiving ITS-S processes the received DENM and provides the DENM content to an ITS-S application. This ITS-S application may present the information to the driver if information of the road hazard or traffic condition is assessed to be relevant to the driver. The driver is then able to take appropriate actions to react to the situation accordingly.

In general, DENM is transmitted through V2V or V2I communication.

Life Cycle of a DENM (as Discussed in ETSI EN 302 637-3)

Road Hazard Event Detection

A concerned road hazard event is detected by the originator ITS station.

Generation of DENM

When the originator ITS station detects a concerned event, the DEN management constructs a DENM.

Repetition of DENM transmission

The DENM transmission frequency of a DENM is delivered by the upper layer (ITS-S application) to the lower layer (ITS Facilities layer) to indicate the time interval between two consecutive DENM transmissions (i.e. the transmission frequency).

In between two consequent DENM updates, a DENM may be repeated by the DEN basic service of the originating ITS-S at a pre-defined repetition interval, in order that new ITS-Ss entering the destination area during the event validity duration may also receive the DENM. This process is referred to as DENM repetition.

The DENM repetition shall be activated under the request from the ITS-S application. If ITS-S application at the originating ITS-S requires the repetition of DENM, it shall provide following data in the application request as specified in clause 5.4.1 of [8]:

repetitionInterval.
repetitionDuration.

If any of the above data are not provided by the ITS-S application, the DEN basic service shall not execute the DENM repetition. At the reception of the application request, the DENM repetition scheduling shall start from the referenceTime, corresponding to the time at which DENM is generated.

For one particular actionID, DENM repetition should apply to the most updated DENM.

Evolution of DENM

When the originator ITS station detects the event evolution, the DEN management constructs new DENM including the updated information. A data version number is assigned to DENM to indicate the event evolution.

Termination of the DENM event

The termination of the event can be indicated in two ways:

A cancellation DENM is sent by the originator ITS station when the event termination is detected. The cancellation message is regarded as a DENM with a special data version.

A negation DENM is sent by one or several third party ITS stations that have received DENM earlier. When such third party ITS stations detect that the event does not exist anymore, it generates a DENM to negate the event. A negation flag is included in the DENM. The third party ITS stations that initiate the event negation shall be an authorized ITS station.

Once a cancellation or negation DENM is transmitted by an ITS station, it shall be repeated for a certain duration defined by the RHW application.

General Protocol Operation:

Upon reception of a request from ITS-S application via the interface IF.DEN.1, the DEN basic service shall execute the following operations:

For application request type appDENM_trigger,

1) Calculate expiration time for timer T_O_Validity (clause 8.2.1.5 of [8]):
   a. If expiration time of timer T_O_Validity is in the past, send a failure notification to the ITS-S application and omit the execution of further steps.
   b. Otherwise, continue the operation.
2) Assign unused actionID value (clause 8.2.1.2 of [8]).→Station ID (32 bits)+SequenceNumber (16 bits)
3) If transmissionInternval is provided by the application request:
   a. Set transmissionInterval,
   b. otherwise, continue the operation.
4) Set other fields of DENM management container, situation container, location container and à la carte container (Annex A of [8]).
5) Set referenceTime to the current time.
6) Construct DENM.
7) Pass the DENM to the ITS networking & transport layer.
8) Create an entry in the originating ITS-S message table and set the state to ACTIVE.
9) Start/restart timer T_O_Validity.
10) If repetitionDuration >0 and repetitionInterval >0:
    a. Calculate and start timer T_RepetitionDuration and T_Repetition.
    b. otherwise, continue the operation.
11) Send actionID to the requesting ITS-S application.
12) End.

. . .

When the timer T_Repetition expires, DEN basic service shall execute the following operations:

1) Pass the DENM to ITS networking & transport layer,
2) Restart timer T_Repetition.

In addition, 3GPP RAN WG concluded that V2V services based on LTE sidelink is feasible and considered that some enhancement could be needed in order to fulfil the V2X requirements, as discussed in 3GPP RP-160649 as follows:

3GPP is actively conducting study and specification work on LTE-based V2X in order to respond to this situation. A SA1 work item was approved in SP-150573 to specify service requirements. SA2 agreed a study item in S2-153532 to identify and evaluate potential architecture enhancements. In RAN#68, a study item on LTE-based V2X Services was approved in RP-151109. In this study PC5-based V2V has been given highest priority until RAN#70. The motivation for prioritizing V2V until RAN#70 is to start a V2V work item in December 2015, as proposed in RP-151082. This RAN Feasibility Study (FS_LTE_V2X, TR 36.885) has completed the part of PC5 transport for V2V services. The RAN study concluded that it is feasible to support V2V services based on LTE PC5 interface with necessary enhancements, and the study also recommended to enhance at least LTE sidelink resource allocation, physical layer structure, and synchronization. In the meantime, the RAN study is also considering V2V operation scenarios based on not only LTE PC5 interface but also LTE Uu interface or a combination of Uu and PC5, and the maximum efficiency of V2V services may be achieved by selecting/switching the operation scenario properly.

Early completion of the corresponding RAN specification for PC5-based V2V and integration with Uu interface will enable fast preparation for device and network implementation, thereby allowing more chance for LTE-based V2V in the market. In addition, it can provide the basis for other V2X services, especially V2I/N and V2P services, so that RAN support for all the V2X services can be completed in time.

In 3GPP TR 23.785, V2X transmission/reception via PC5 interface is introduced as follows:

6.2 Solution #2: V2X Message Transmission/Reception for V2V/P Services Using PCS 6.2.1 Functional Description 6.2.1.1 General This solution corresponds to the Key Issue #2 "V2X message transmission/reception for V2V Service and V2P Service".

Transmission of a V2X message for V2V Service and V2P Service can be made using PC5. FIG. 6.2.1.1-1 (a) shows V2X message transmission/reception over PC5 when the UEs are "served by E-UTRAN" and FIG. 6.2.1.1-1 (b) shows V2X message transmission/reception over PC5 when the UEs are "not served by E-UTRAN".

Figure 7:
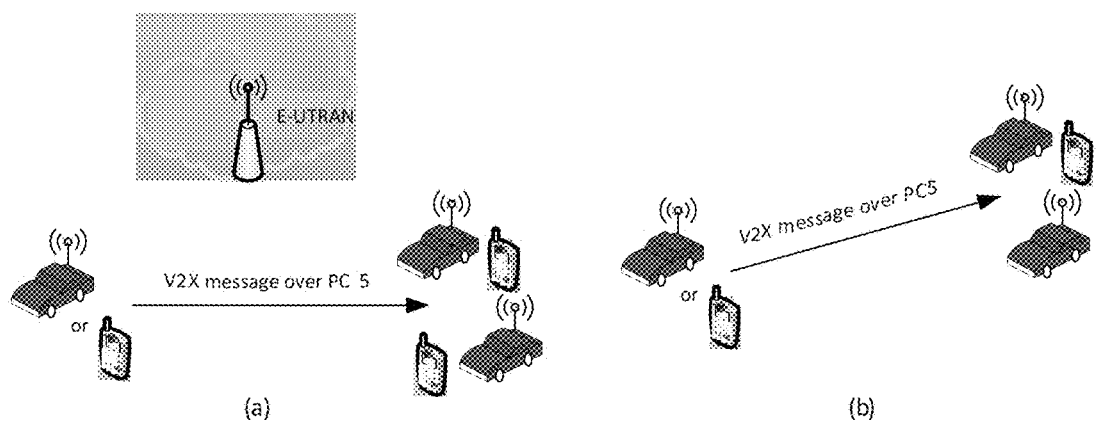
FIG. 7 is a reproduction FIG. 6.2.1.1-1 of 3GPP TR 23.785 v1.0.0.

FIG. 6.2.1.1-1 of 3GPP TR 23.785 v1.0.0, Entitled "Transmission of a V2X Message for V2V Service and V2P Service Over PC5", is Reproduced as FIG. 7

V2X messages over PC5 need to be broadcasted so that all UEs supporting V2V and/or V2P Service in proximity of the V2X message transmitting UE can receive the messages regardless of roaming and serving PLMN. One-to-all ProSe Direct Communication is applicable when the UE is "served by E-UTRAN" and when the UE is "not served by E-UTRAN". The transmitting UE as well as receiving UE authorized for V2X Service as described in Solution #1 (clause 6.1) perform one-to-all ProSe Direct Communication by using addressing/identifiers as described in clause 6.2.1.2.

One-to-all ProSe Direct Communication for V2X has the following characteristics:

- One-to-all ProSe Direct Communication is connectionless. Thus there is no signalling over PC5 control plane.
- The radio layer provides a user plane communication service for transmission of V2X messages between UEs engaged in direct communication.
- IPv6 is used for transmission of IP packets of V2X message. IPv4 is not supported in this release.
- Non-IP based V2X messages are supported.
- Authorization for one-to-all ProSe Direct Communication is configured in the UE as described in Solution #1.

6.2.1.2 Addressing/Identifiers

Each UE has a Layer-2 ID for one-to-all ProSe Direct Communication that is included in the source Layer-2 ID field of every frame that it sends on the layer-2 link. The UE self-assigns the Layer-2 ID for one-to-all ProSe Direct Communication.

The UE auto-configures a link local IPv6 address following procedures defined in RFC 4862 [6]. This address can be used as the source IP address for one-to-all ProSe Direct Communication.

In order to ensure that a vehicle cannot be tracked or identified by any other vehicle beyond a certain short time-period required by the application, the source Layer-2 ID and the source IP address must be changed over time.

The UE is configured with the destination Layer-2 ID(s) to be used for V2X services. V2X application selects the L2 ID for a V2X message based on the configuration.

6.2.1.3 User Plane Stacks

[ . . . ]

Figure 8:
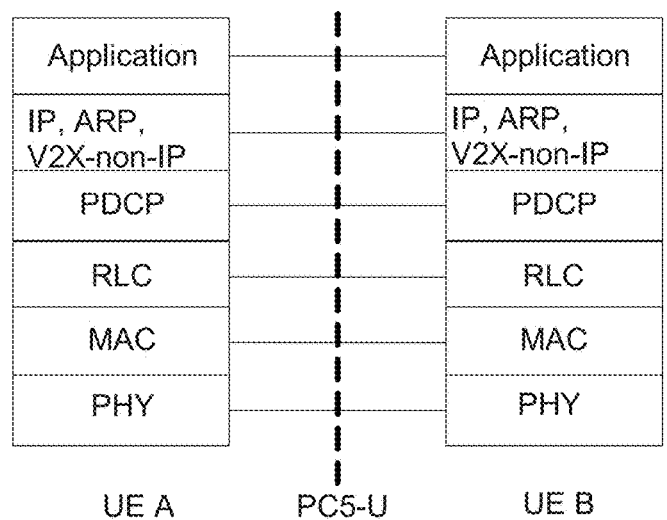
FIG. 8 is a reproduction of FIG. 6.2.1.3-1 of 3GPP TR 23.785 v1.0.0.

FIG. 6.2.1.3-1 of 3GPP TR 23.785 v1.0.0, Entitled "User Plane for PC5 Interface Supporting V2X", is Reproduced as FIG. 8

[ . . . ]

6.2.2 Procedures

To perform one-to-all ProSe Direct Communication, the UE is configured with the related information for one-to-all ProSe Direct Communication as defined in Solution #1.

The procedure for one-to-many ProSe Direct Communication transmission described in clause 5.4.2 of TS 23.303 [5] is applied to one-to-all ProSe Direct Communication for V2X message transmission for V2V/P Services using PC5 with following differences:

- The source Layer-2 ID is set to the Layer-2 ID described in clause 6.2.1.2.
- A UE shall be configured with a set of Layer-2 ID corresponding to different type of services.

The procedure for one-to-many ProSe Direct Communication reception described in clause 5.4.3 of TS 23.303 [5] is applied to one-to-all ProSe Direct Communication for V2X message reception for V2V/P Services using PC5.

3GPP TR 23.785 also introduces QoS (Quality of Service) control for V2X transmission/reception via PC5 interface as follows:

6.6 Solution #6: QoS Handling for PC5 Based Message
6.6.1 Functional Description
6.6.1.1 General This solution corresponds to the Key Issue #4 "V2X message prioritization for V2V Service and V2P Service" and Key Issue #7 "QoS for V2X Service".

When PC5 is used for the transmission of V2X messages, the following principles are followed:

- ProSe Per-Packet Priority (PPPP) defined in clause 5.4.6.1 of TS 23.303 [5] applies to the V2X communication using PC5.
- The application layer sets the PPPP of the V2X message when passing it to lower layer for transmission.
- The mapping of application layer V2X message priority to PPPP is based on pre-configuration on the UE. The configuration of such mapping on the UE is out of scope of 3GPP.
- Core Network, i.e. MME, provides the UE-PC5-AMBR based on subscription information to the eNB as part of the UE context information.

When network scheduled operation mode is used, following additional principles apply:

- UE provides priority information reflecting PPPP to the eNB for resources request.
- When the eNB receives a request for PC5 resource from a UE, the eNB can deduce the packet delay budget and reliability from the priority information from the UE.
- eNB can use the priority information for priority handling and UE-PC5-AMBR for capping the UE PC5 transmission in the resources management.

In addition, 3GPP TR 23.785 introduces V2X transmission/reception via Uu interface as follows:

6.3 Solution #3: V2X Message Transmission/Reception for V2V/P Services Via LTE-Uu
6.3.1 Functional Description
6.3.1.1 General This solution corresponds to the Key Issue #2 "V2X message transmission/reception for V2V Service and V2P Service" and Key Issue #6b "Latency improvements for eMBMS".

The proposed solution applies to the case where the UE sends the V2X message via LTE-Uu and the V2X message is forwarded to multiple UEs over LTE-Uu as shown in FIG. 6.3.1.1-1.

Figure 9:
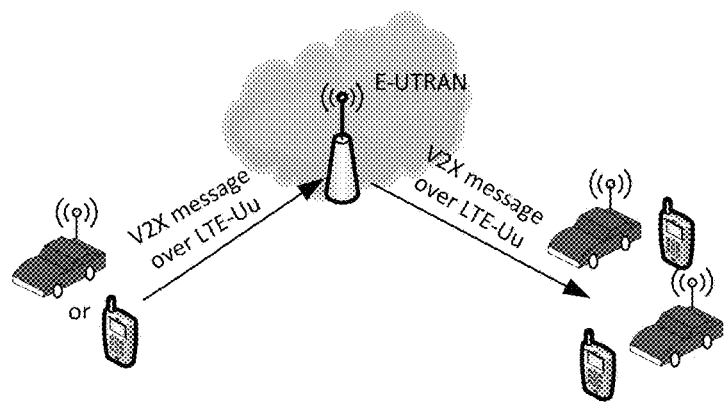
FIG. 9 is a reproduction of FIG. 6.3.1.1-1 of 3GPP TR 23.785 v1.0.0.

FIG. 6.3.1.1-1 of 3GPP TR 23.785 v1.0.0, Entitled "V2X Message Transmission/Reception for V2V/P Services Via LTE-Uu", is Reproduced as FIG. 9

Furthermore, 3GPP TR 23.785 introduces QoS control for V2X transmission/reception via Uu interface as follows:

6.7 Solution #7: New QCI Values for LTE-Uu Based V2X Message Transmission/Reception

6.7.1 Functional Description

The V2X messages for V2V/P Services can be transmitted periodically or based on a certain event. LTE-Uu based V2X message transmission for V2V/P Services has to fulfil the following latency requirement:

100 ms for V2X message delivery from the transmitting UE and to the receiving UEs The V2X message can be delivered via Non-GBR bearer as well as GBR bearer. However, there is neither existing standardized Non-GBR QCI nor existing standardized GBR QCI which meets the latency requirement for V2X message delivery for V2V/P Services. Therefore, this solution proposes to define a new Non-GBR QCI value and a new GBR QCI value for V2X messages for QoS support.

The rationale of setting performance characteristics for newly defined GBR QCI value is as below:

Resource Type is GBR.

Packet Delay Budget (PDB) is set to 50 ms (=100 ms/2).

Priority Level is set to be higher value than QCI for Public Safety (i.e. >0.7) and lower value than QCIs for non-Public Safety (i.e. <2).

Packet Error Loss Rate (PELR) is set to support high reliability without requiring application-layer message retransmissions while considering the low PDB which may cause the higher PELR.

The rationale of setting performance characteristics for newly defined Non-GBR QCI value is as below:

Resource Type is Non-GBR.

Packet Delay Budget (PDB) is set to 50 ms (=100 ms/2).

Priority Level is set to be higher value than QCI for Public Safety (i.e. >5.5) and lower value than QCIs for non-Public Safety (i.e. <6) by only considering QCIs for non-signalling.

Packet Error Loss Rate (PELR) is set to support high reliability without requiring application-layer message retransmissions while considering the low PDB which may cause the higher PELR.

Table 6.7.1-1 captures QCI characteristics for V2X messages.

Table 6.7.1-1 of 3GPP TR 23.785 v1.0.0, Entitled "QCI Characteristics for V2X Messages", is Reproduced as FIG. 10

In RAN1#84bis meeting, the following agreements were made:

RAN1#84bis Agreement

For SPS of V2V traffic for mode-1 SPS on PC5:

The eNB may configure multiple SPS configurations for a given UE

At least SPS-configuration-specific MCS (if MCS is part of the SPS-configuration) and SPS-configuration-specific periodicity can be configured FFS if/which other SPS parameters can differ across the SPS-configurations The eNB can dynamically trigger/release the different SPS-configurations by use of (E)PDCCH Details of the trigger/release are FFS In RAN2#94 meeting, the following agreements were made:

RAN2#94 V2V WI Agreements

Multiple SPS configuration with different configuration parameters can be configured by eNB. Which SPS configuration is being activated/deactivated can be signalled. Details of control signalling are left to RAN1. It is FFS whether we allow multiple configurations to be active at the same time. Two options are possible:

One active SPS at a time (as per LTE)

Multiple SPS active at a time (SPS configuration and UE assistance information may be linked to one or more radio bearers).

UE assistance at least on periodicity and/or timing can be provided to eNB. UE assistance can be configured by eNB. UL SPS configuration is decided by eNB. Triggering of UE assistance are FFS.

In the email discussion of [94#31] [LTE V2V], multiple SPS configurations activated on a UE at a time was proposed.

In 3GPP TR23.785, QoS handling was introduced as follows:

6.6 Solution #6: QoS Handling for PC5 Based Message

6.6.1 Functional Description

6.6.1.1 General

This solution corresponds to the Key Issue #4 "V2X message prioritization for V2V Service and V2P Service" and Key Issue #7 "QoS for V2X Service".

When PC5 is used for the transmission of V2X messages, the following principles are followed:

ProSe Per-Packet Priority (PPPP) defined in clause 5.4.6.1 of TS 23.303 [5] applies to the V2X communication using PC5.

The application layer sets the PPPP of the V2X message when passing it to lower layer for transmission.

The mapping of application layer V2X message priority to PPPP is based on pre-configuration on the UE. The configuration of such mapping on the UE is out of scope of 3GPP.

[ . . . ]

In RAN2#95 meeting, agreements were made that a UE can report UE assistance information to request SPS resources and the UE can send SidelinkUEInformation to eNB for sidelink resources if it is interested in V2X as follows:

SPS

Multiple SPS can be activated simultaneously

UE assistance triggers are left to UE implementation. The network should be able to configure UE assistance information.

The UE assistant information includes a set of preferred expected SPS interval, timing offset with respect subframe0 of the SFN0 (frame and subframe number). FFS if per logical channel.

UE Assistance:

The UE Assistance Information is allowed to be reported if change in estimated periodicity of packet arrival occurs The UE Assistance Information is allowed to be reported if change in estimated offset of packet arrival occurs The UE assistance information is configured by the eNB The UE Assistance Info can be reported both in case SPS is configured or not UE Assistance Info per SPS existing or suggested configuration(s). Details of configurations are FFS.

UE Assistance information reporting is configured by the eNB at least for PC5 V2X.

Additional Content of UE

If configured by the eNB, SPS index of the SPS configuration

Layer 2 Protocol
[ . . . ]
RRC Related Aspects

When requesting sidelink resources, the UE should inform the eNB that it is interested in V2X in SidelinkUE-information According to 3GPP S2-162038, each type of V2X message can be distinguished by the Provider Service Identifier (PSID) field in the WSMP header as follows:

In addition, for the non-IP V2X messages, WAVE makes use of the WSMP headers to multiplexing the different service layer messages (and different message sets). An example of the WSMP message is provided in IEEE 1609.3, as shown in FIG. 2.

FIG. 2 of 3GPP S2-162038, Entitled "Example of WSMP Message", is Reproduced as FIG. 11

The Provider Service Identifier (PSID) field of the WSMP header provides the information about the service layer, and allows the message forwarding. The PSID values are defined in IEEE 1609.12, for example, BSM message can use 0x20, and CAM can use 0x24.

In 3GPP TS 23.285, identifiers for V2X communication over PC5 reference point are specified as follows:
4.5.1 Identifiers for V2X Communication Over PC5 Reference Point Each UE has a Layer-2 ID for the V2X communication over PC5 reference point, which is included in the source Layer-2 ID field of every frame that it sends on the layer-2 link. The UE self-assigns the Layer-2 ID for the V2X communication over PC5 reference point.

When IP based V2X messages are supported, the UE auto-configures a link local IPv6 address to be used as the source IP address, as defined in clause 4.5.3 of TS 23.303 [5].

In order to ensure that a vehicle cannot be tracked or identified by any other vehicles beyond a certain short time-period required by the application, the source Layer-2 ID must be changed over time.

Editor's Note: For IP based V2X communication over PC5 reference point, SA3 will decide whether the source IP address needs to be changed over time.

The UE is configured with the destination Layer-2 ID(s) to be used for V2X services. The Layer-2 ID for a V2X message is selected based on the configuration as described in clause 4.4.1.1.
[ . . . ]
4.4.1.1.2 Policy/Parameter Provisioning The following information is provisioned to the UE for V2X communications over PC5 reference point:
[ . . . ]

3) Policy/parameters for V2X communication over PC5 reference point:

The mapping of Destination Layer-2 ID(s) and the V2X services, e.g. PSID or ITS-AIDS of the V2X application.

The content of a SidelinkUEInformation is specified in 3GPP TS 36.331 as follows:

SidelinkUEInformation

The SidelinkUEInformation message is used for the indication of sidelink information to the eNB.

```
...
SidelinkUEInformation-r12-IEs ::=        SEQUENCE {
    commRxInterestedFreq-r12             ARFCN-ValueEUTRA-r9          OPTIONAL,
    commTxResourceReq-r12                SL-CommTxResourceReq-r12     OPTIONAL,
    discRxInterest-r12                   ENUMERATED {true}            OPTIONAL,
    discTxResourceReq-r12                INTEGER (1..63)              OPTIONAL,
    lateNonCriticalExtension             OCTET STRING                 OPTIONAL,
    nonCriticalExtension                 SidelinkUEInformation-v1310-IEs   OPTIONAL
}
SidelinkUEInformation-v1310-IEs          ::=SEQUENCE {
    commTxResourceReqUC-r13              SL-CommTxResourceReq-r12     OPTIONAL,
    commTxResourceInfoRegRelay-r13           SEQUENCE {
        commTxResourceRegRelay-r13           SL-CommTxResourceReq-r12     OPTIONAL,
        commTxResourceRegRelayUC-r13         SL-CommTxResourceReq-r12     OPTIONAL,
        ue-Type-r13                          ENUMERATED {relayUE, remoteUE}
    }                                                                 OPTIONAL,
    discTxResourceReq-v1310              SEQUENCE {
        carrierFreqDiscTx-r13                INTEGER (1..maxFreq)         OPTIONAL,
        discTxResourceReqAddFreq-r13         SL-DiscTxResourceReqPerFregList-r13
    OPTIONAL
    }                                                                 OPTIONAL,
    discTxResourceReqPS-r13              SL-DiscTxResourceReq-r13     OPTIONAL,
    discRxGapReq-r13                     SL-GapRequest-r13            OPTIONAL,
    discTxGapReq-r13                     SL-GapRequest-r13            OPTIONAL,
    discSysInfoReportFreqList-r13            SL-DiscSysInfoReportFreqList-r13
    OPTIONAL,
    nonCriticalExtension                 SEQUENCE { }                 OPTIONAL
}
SL-CommTxResourceReq-r12 ::=             SEQUENCE {
    carrierFreq-r12                      ARFCN-ValueEUTRA-r9          OPTIONAL,
    destinationInfoList-r12                  SL-DestinationInfoList-r12
}

SL-DestinationInfoList-r12 ::=           SEQUENCE (SIZE (1..maxSL-Dest-r12)) OF SL-
DestinationIdentity-r12
SL-DestinationIdentity-r12 ::=           BIT STRING (SIZE (24))
[...]
...
```

| SidelinkUEInformation field descriptions |
|---|
| [ . . . ] |
| destinationInfoList |
| Indicates the destination(s) for relay or non-relay related one-to-one or one-to-many sidelink communication. For one-to-one sidelink communication the destination is identified by the ProSe UE ID for unicast communication, while for one-to-many the destination it is identified by the ProSe Layer-2 Group ID as specified in TS 23.303 [68]. |

Sidelink BSR MAC Control Elements are specified in 3GPP TS 36.321 for UEs to report sidelink buffer status as follows:

6.1.3.1a Sidelink BSR MAC Control Elements

Sidelink BSR and Truncated Sidelink BSR MAC control elements consist of one Destination Index field, one LCG ID field and one corresponding Buffer Size field per reported target group.

The Sidelink BSR MAC control elements are identified by MAC PDU subheaders with LCIDs as specified in table 6.2.1-2. They have variable sizes.

For each included group, the fields are defined as follows (FIGS. 6.1.3.1a-1 and 6.1.3.1a-2):
Destination Index: The Destination Index field identifies the ProSe Destination. The length of this field is 4 bits. The value is set to the index of the destination reported in destinationinfoList and if destinationinfoListUC is also reported, the value is indexed sequentially across both lists specified in [8];
LCG ID: The Logical Channel Group ID field identifies the group of logical channel(s) which buffer status is being reported. The length of the field is 2 bits;
Buffer Size: The Buffer Size field identifies the total amount of data available across all logical channels of a LCG of a ProSe Destination after all MAC PDUs for the TTI have been built. The amount of data is indicated in number of bytes. It shall include all data that is available for transmission in the RLC layer and in the PDCP layer; the definition of what data shall be considered as available for transmission is specified in [3] and [4] respectively. The size of the RLC and MAC headers are not considered in the buffer size computation. The length of this field is 6 bits. The values taken by the Buffer Size field are shown in Table 6.1.3.1-1;
R: Reserved bit, set to "0".
Buffer Sizes of LCGs are included in decreasing order of the highest priority of the sidelink logical channel belonging to the LCG irrespective of the value of the Destination Index field.

Figure Omitted

FIG. 6.1.3.1a-1: Sidelink BSR and Truncated Sidelink BSR MAC Control Element for Even N Figure Omitted FIG. 6.1.3.1a-2: Sidelink BSR and Truncated Sidelink BSR MAC Control Element for Odd N Currently, SA2 discussed that each V2X message passed to lower layer for transmission will be associated with one PPPP (ProSe Per Packet Priority), as discussed in 3GPP TR 23.785. And each V2X message will be mapped to one logical channel based on the PPPP of the V2X message since there is one PPPP associated with each logical channel, as discussed in 3GPP TS 36.300.

Possibly, the application layer of UE which generates CAM messages and DENM messages would set different PPPPs of the CAM message and DENM (Decentralized Environmental Notification Message) message since purposes of CAM and DENM transmissions are different, as discussed in ETSI EN 302 637-2 and 302 637-3. Therefore, the logical channel of the CAM messages and the logical channel of the DENM messages may be different.

Figure 12:
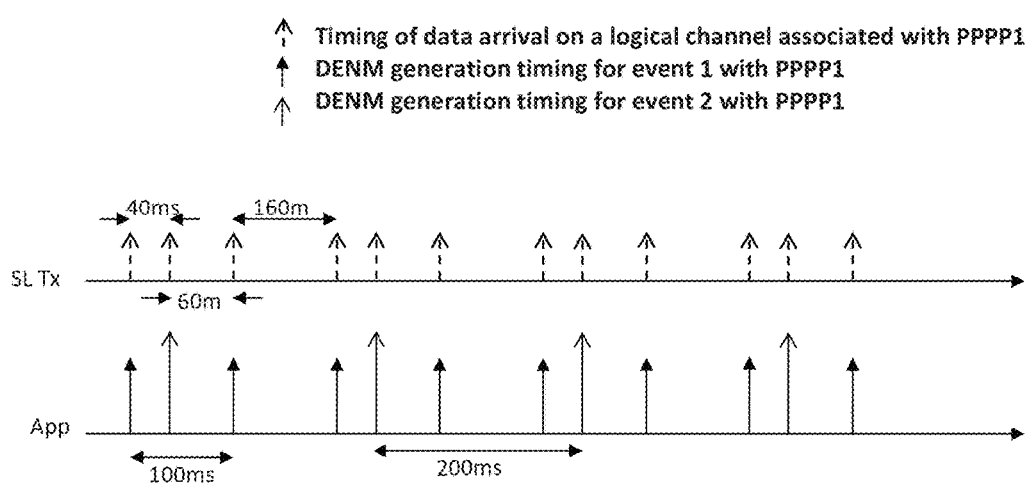
FIG. 12 is an illustration according to one exemplary embodiment.

According to Table 1 of ETSI EN 102 637-3, there are 13 different events for triggering DENM generations. Currently, there are 8 values for setting a PPPP, as discussed in 3GPP TS 23.303. In this situation, multiple DENM messages generated due to different events may share one PPPP and thus these DENM messages with different traffic characteristics (e.g., periodicity, generation timing, message size, etc.) will be mapped to same logical channel. If this is the case, in access stratum (AS) layer point of view, the timing to transmit DENM messages on the logical channel may become aperiodic if the ITS-S application layer of the UE detects more than one event. This is generally illustrated in FIG. 12.

In the email discussion of 3GPP email discussion of [94#31] [LTE V2V] Layer 2 Open Issues for V2V, some companies consider that SPS configuration and UE assistance information (including traffic characteristics) should be linked to logical channels so that traffic characteristics and transmission resources (e.g., SPS (Semi-Persistent Scheduling) interval and timing offset) of specific logical channel can be matched to each other. However, whether SPS configuration and UE assistance information should be linked to logical channels is not concluded yet, as discussed in the email discussion of 3GPP email discussion of [94#31] [LTE V2V] Layer 2 Open Issues for V2V.

In general, if one SPS configuration is linked to the logical channel of CAM messages and another SPS configuration is linked to the logical channel of DENM messages, the UE can transmit UE assistance information (including change of traffic characteristics) linked to specific logical channel to the eNB for reactivating or modifying the SPS configuration linked to the specific logical channel. In this case, linking UE assistance information to logical channels seems feasible.

However, if the UE has multiple DENM messages with different traffic characteristics for transmission during a certain period and these DENM messages are mapped to same logical channel, more than one SPS configurations would be linked to the logical channel. In this situation, linking UE assistance information to logical channels is not useful because the logical channel linked to the UE assistance information is linked to multiple SPS configurations; and thus the eNB cannot know which SPS configuration among activated SPS configurations linked to the logical channel should be reactivated, modified, or deactivated when it receives the UE assistance information from the UE.

If this is the case, how to design the content of UE assistance information for indicating which SPS configuration among activated SPS configurations to be reactivated, modified or deactivated should be further studied. Thus, there are two possible ways to solve this issue.

One solution is generally to separate logical channels for separate transmissions of DENM messages where traffic characteristics of DENM messages on its own logical channel could be different from each other even if these logical channels are associated with same PPPP. In this situation, linking UE assistance information to logical channels is feasible. However, this solution may require additional information (e.g., action ID discussed in ETSI EN 302

637-3) provided by the upper layer of the UE for assisting the lower layer of the UE for mapping these DENM messages to specific logical channel. In order words, this solution needs to specify more interactions between the upper layer and the lower layer.

Figure 13:
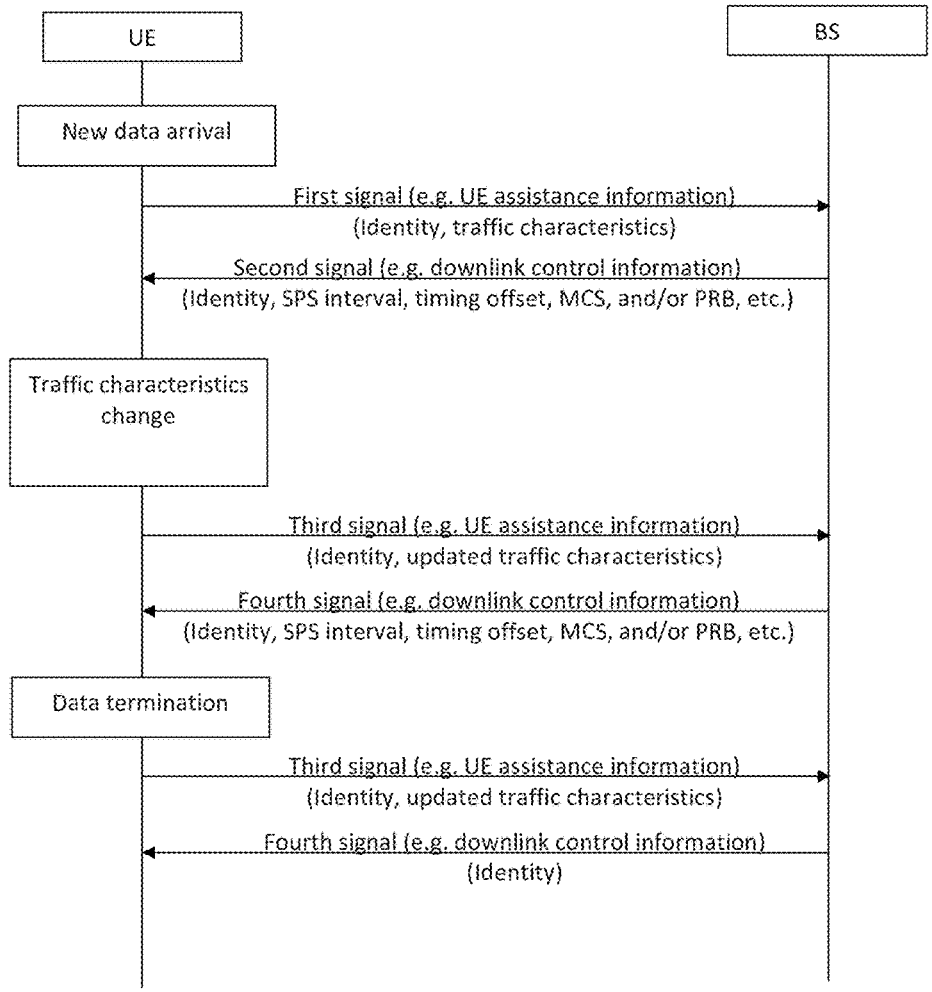
FIG. 13 is a message chart according to one exemplary embodiment.

The other solution is generally to link the SPS configuration with the associated V2X message using an additional identity. For example, the UE assistance information includes this identity so that the eNB can know which SPS configuration among activated SPS configurations should be reactivated, modified, or deactivated based on the identity included in the received UE assistance information. In addition, the eNB can also include this identity in the signal used to allocate the modified SPS configuration so that the UE can associate this SPS configuration to the corresponding V2X message. In principle, this solution could be applied for Uu interface or PC5/SL interface. FIG. 13 illustrates an exemplary embodiment of this solution.

In general, the UE may transmit UE assistance information to the eNB for different purposes (e.g., SPS configuration activation, reactivation, or deactivation). In one embodiment, the UE assistance information containing traffic characteristics (e.g., periodicity of data, data size or etc.) may be sent to the eNB when a new V2X message is passed to the lower layer of the UE for transmission. The UE may assign the identity used to associate the SPS configuration (or SPS resources) with the V2X message. Optionally, the field of this identity could be set to a specific value which is used to indicate a request for new SPS resources for the V2X message. In other words, the UE sets this field to a specific value if the UE currently has no any SPS resources used for transmission of the V2X message. More specifically, the specific value is not a normal identity. For example, this field may contain 4 bits, 8 values ('0000'~'0111') could be used for normal identities, '1111' could be the specific value, and other values ('1000'~'1110') could be reserved.

In response to reception of the UE assistance information, the eNB replies a signal (e.g., downlink control information) to activate a SPS configuration (or SPS resources). The eNB may assign an identity and includes this identity in the signal if this identity field is set to the specific value. Otherwise (i.e., this identity field is set to a normal value), eNB just includes this identity assigned by the UE in the signal. More specifically, the signal or downlink control information may contain the identity and SPS configuration (e.g., information indicating an SPS interval, timing offset, MCS, and/or PRB, etc.).

In one embodiment, the UE assistance information may contain updated traffic characteristics (e.g., periodicity of data, data size or etc.) when traffic characteristics of the V2X message change. In this situation, the identity associated with the activated SPS configuration (or SPS resources) in the UE for the V2X message is included in the UE assistance information. In response to reception of the UE assistance information, the eNB modifies the concerned SPS configuration (or SPS resources) associated with the identity and sends another signal (or downlink control information) to the UE. More specifically, the signal or downlink control information may contain the identity and the updated SPS configuration (e.g., information indicating an SPS interval, timing offset, MCS, and/or PRB, etc.).

In one embodiment, the UE assistance information may indicate the end of transmission of V2X messages, wherein an identity associated with an activated SPS configuration (or SPS resources) in the UE could be included in the UE assistance information. In response to reception of the UE assistance information, the eNB deactivates the SPS configuration associated with the identity. More specifically, the eNB provides downlink control information to the UE, wherein the downlink control information may contain SPS release information with the identity for releasing the SPS configuration (or SPS resources) associated with the identity.

In another embodiment, the identity used to associate the SPS configuration (or SPS resources) with the V2X message is an identity of the SPS configuration (e.g., SPS Configuration ID), an identity of the SPS resources (e.g., SPS Grant ID) or an identity of the V2X message (e.g., Action ID).

Figure 14A:
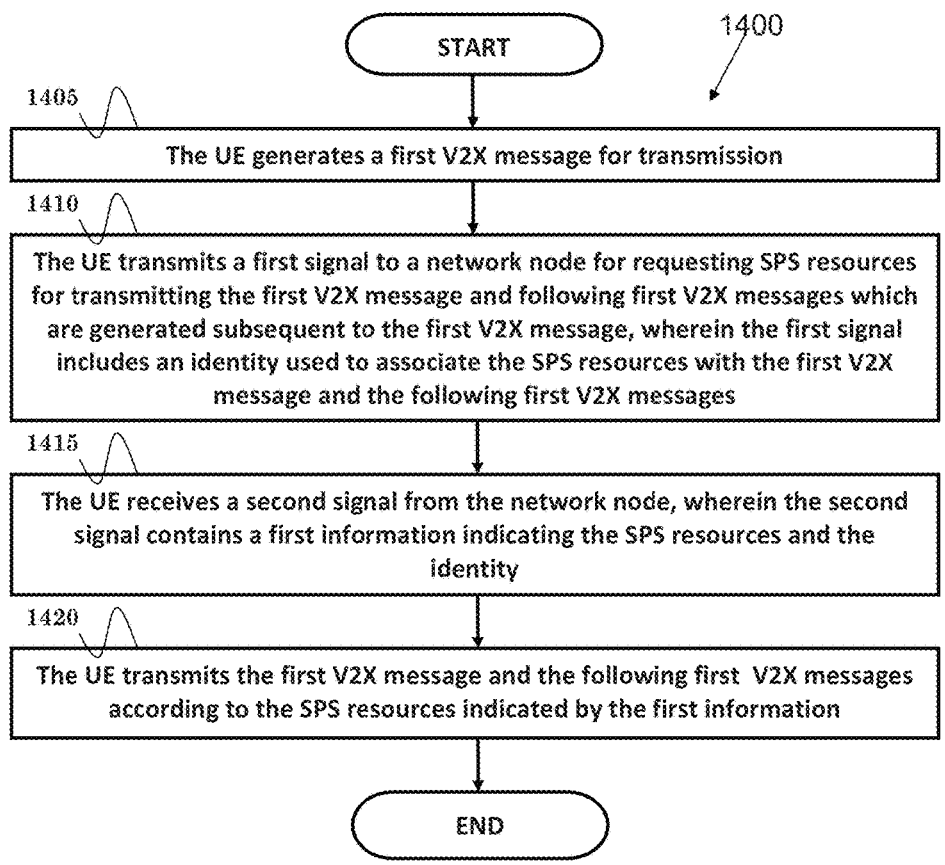
FIGS. 14A and 14B are flow charts according to one exemplary embodiment from the perspective of a UE.

FIG. 14A is a flow chart 1400 according to one exemplary embodiment, from the perspective of a UE, for requesting SPS resources for V2X message transmissions. In step 1405, the UE generates a first V2X message for transmission. In step 1410, the UE transmits a first signal to a network node for requesting SPS resources for transmitting the first V2X message and following first V2X messages which are generated subsequent to the first V2X message, wherein the first signal includes an identity used to associate the SPS resources with the first V2X message and the following first V2X messages. In step 1415, the UE receives a second signal from the network node, wherein the second signal contains a first information indicating the SPS resources and the identity. In step 1420, the UE transmits the first V2X message and the following first V2X messages according to the SPS resources indicated by the first information.

Figure 14B:
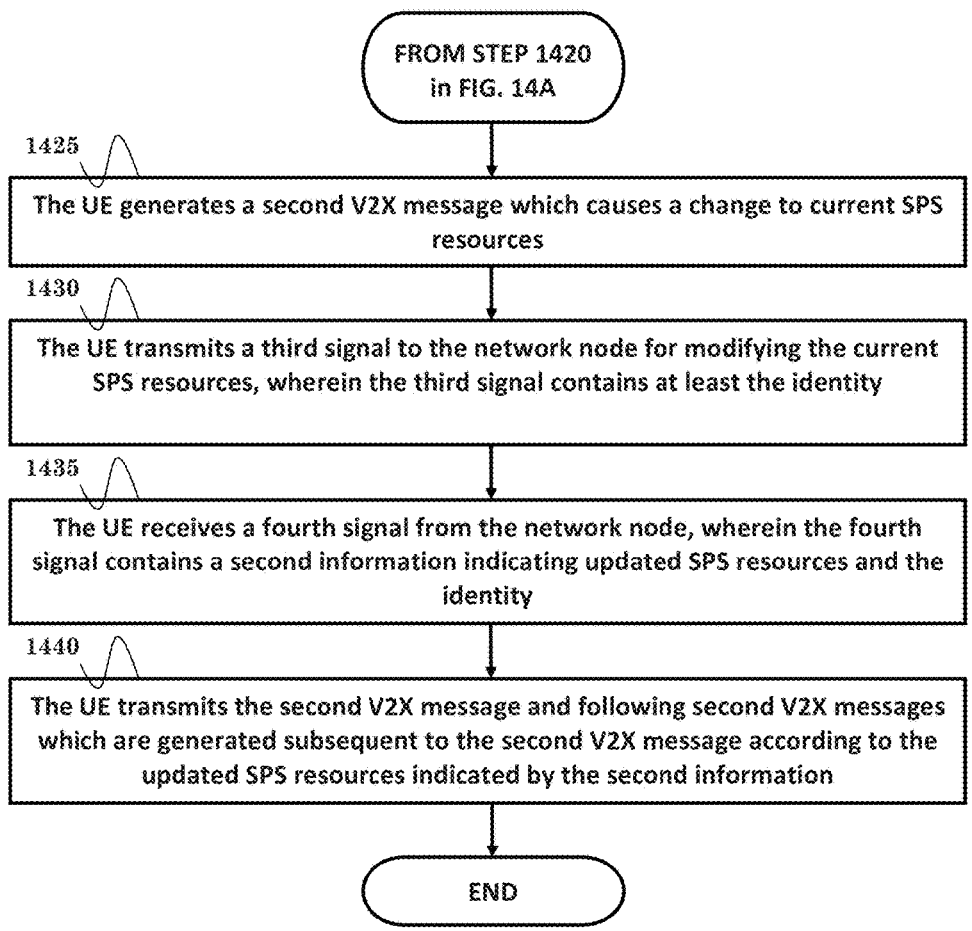

In an alternative embodiment illustrated in FIG. 14B, the UE generates a second V2X message which causes a change to current SPS resources as shown in step 1425. In step 1430, the UE transmits a third signal to the network node for modifying the current SPS resources, wherein the third signal contains at least the identity. In step 1435, the UE receives a fourth signal from the network node, wherein the fourth signal contains a second information indicating updated SPS resources and the identity. In step 1440, the UE transmits the second V2X message and following second V2X messages which are generated subsequent to the second V2X message according to the updated SPS resources indicated by the second information.

Referring back to FIGS. 3 and 4, in one exemplary embodiment of a UE for requesting SPS resources for V2X message, the device 300 includes a program code 312 stored in the memory 310. The CPU 308 could execute program code 312 to enable the UE (i) to generate a first V2X message for transmission, (ii) to transmit a first signal to a network node for requesting SPS resources for transmitting the first V2X message and following first V2X messages which are generated subsequent to the first V2X message, wherein the first signal includes an identity used to associate the SPS resources with the first V2X message and the following first V2X messages, (iii) to receive a second signal from the network node, wherein the second signal contains a first information indicating the SPS resources and the identity, and (iv) to transmit the first V2X message and the following first V2X messages according to the SPS resources indicated by the first information.

In an alternative embodiment, the CPU 308 could further execute program code 312 to enable the UE (i) to generate a second V2X message which causes a change to current SPS resources, (ii) to transmit a third signal to the network node for modifying the current SPS resources, wherein the third signal contains at least the identity, (iii) to receive a fourth signal from the network node, wherein the fourth signal contains a second information indicating updated SPS resources and the identity, and (iv) to transmit the second V2X message and following second V2X messages which are generated subsequent to the second V2X message according to the updated SPS resources indicated by the second information.

Furthermore, the CPU 308 can execute the program code 312 to perform all of the above-described actions and steps or others described herein.

Figure 15:
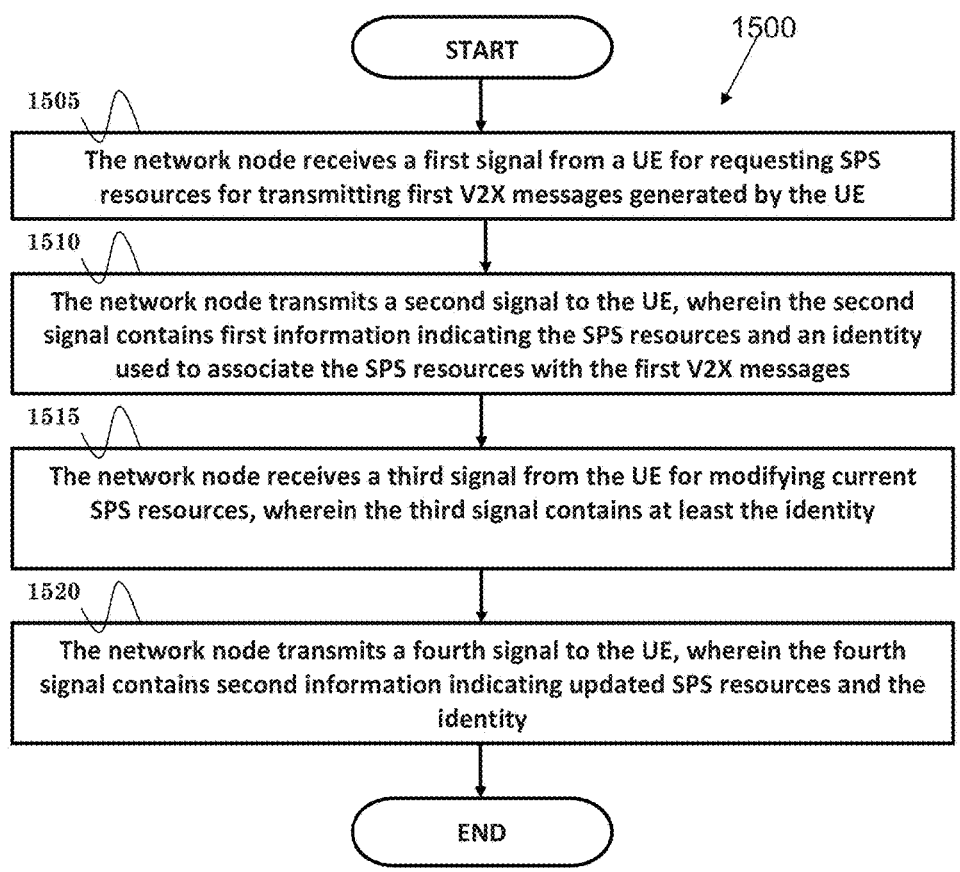
FIG. 15 is a flow chart according to one exemplary embodiment from the perspective of a network node.

FIG. 15 is a flow chart 1500 according to one exemplary embodiment, from the perspective of a network node, for allocating semi-persistent scheduling (SPS) resources for V2X message transmissions. In step 1505, the network node receives a first signal from a UE for requesting SPS resources for transmitting first V2X messages generated by the UE. In step 1510, the network node transmits a second signal to the UE, wherein the second signal contains first information indicating the SPS resources and an identity used to associate the SPS resources with the first V2X messages. In step 1515, the network node receives a third signal from the UE for modifying current SPS resources, wherein the third signal contains at least the identity. In step 1520, the network node transmits a fourth signal to the UE, wherein the fourth signal contains second information indicating updated SPS resources and the identity.

Referring back to FIGS. 3 and 4, in one exemplary embodiment of a network node, the device 300 includes a program code 312 stored in the memory 310. The CPU 308 could execute program code 312 to enable the network node (i) to receive a first signal from a UE for requesting SPS resources for transmitting first V2X messages generated by the UE, (ii) to transmit a second signal to the UE, wherein the second signal contains first information indicating the SPS resources and an identity used to associate the SPS resources with the first V2X messages, (iii) to receive a third signal from the UE for modifying current SPS resources, wherein the third signal contains at least the identity, and (iv) to transmit a fourth signal to the UE, wherein the fourth signal contains second information indicating updated SPS resources and the identity. Furthermore, the CPU 308 can execute the program code 312 to perform all of the above-described actions and steps or others described herein.

In the context of the embodiments illustrated in FIGS. 14A-14B and 15, in one embodiment, the network node could be an eNB (evolved Node B) or a base station.

In one embodiment, the first signal could contain traffic characteristics (e.g., periodicity, generation timing, and/or message size) for the first V2X message and the following first V2X messages. Furthermore, the second signal could be a SPS (Semi-Persistent Scheduling) initialization signaling. In addition, the third signal could contain traffic characteristics (e.g., periodicity, generation timing, and/or message size) for the second V2X message and the following second V2X messages. Also, the fourth signal could be a SPS re-initialisation signaling.

In one embodiment, the identity could be set by the UE. Alternatively, the identity could be set by the network node and included in the second signal. Furthermore, a field of the identity in the first signal could be set to a specific value used to request SPS resources for the first V2X message which is not associated with any SPS resources. In addition, the specific value is not a normal identity used to identify specific SPS resources. Also, the identity could be an identity of the SPS resources (e.g., SPS configuration ID or SPS grant ID). Furthermore, an identity could be an identity of the V2X messages (e.g., Action ID).

In one embodiment, the V2X messages could be CAM messages. In addition, the first and second V2X messages are generated when a specific event is detected. Alternatively, the V2X messages could be DENM messages. Furthermore, different types of V2X messages (e.g., CAM and DENM messages) could be mapped to a same logical channel. In addition, the V2X messages could be generated due to different specific events can be mapped to a same logical channel.

In one embodiment, the first/second information are downlink control information.

According to 3GPP S2-162038 and 3GPP TS 23.285, each V2V type message is associated with one PSID (e.g., CAM [7] uses the PSID value '0x24') corresponding to a Destination Layer-2 ID, i.e., there are a single Destination Layer-2 ID used for CAM message transmission and a single Destination Layer-2 ID used for DENM [8] message transmission.

The UE assistance information is introduced in 3GPP RAN2#95 Chairman's Notes. The content of the UE assistance information may contain (e.g., an expected SPS interval and an expected SPS timing offset and a SPS index associated with the expected SPS interval/timing offset). The UE sends the UE assistance information to request the eNB to schedule SL SPS resources for transmission of V2V messages. However, how to indicate demands of the SL SPS resources has not been concluded yet. It is assumed that the current SL BSR can be used to indicate the SL SPS resource demands, i.e., the eNB could couple the UE assistance information with the SL BSR to acquire complete information for scheduling the SL SPS resources. In general, before start of V2V transmission, the UE should send a destination list in a SidelinkUEInformation to the eNB in order to associate each destination layer-2 ID included in the list with a destination index to be used in the SL (Sidelink) BSR (Buffer Status Report), wherein the list may include a destination layer-2 ID of CAM and a destination layer-2 ID of DENM.

Figure 16:
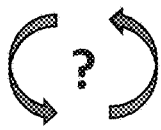
FIG. 16 is an illustration according to one exemplary embodiment.

Currently, the trigger of UE assistance information is left to UE implementation based on, for example, observation on interval between two consecutive V2V packets or periodicity information provided by upper layer. Possibly, the UE may have CAM and DENM messages for SL transmission during a time period. The UE may first trigger the UE assistance information to request the eNB to activate an SPS configurations including expected SPS interval/timing offset for CAM transmissions because the UE has observed CAM's interval, but arrivals of the CAM and DENM messages may trigger a SL BSR indicating resource demands for the CAM transmissions and the DENM transmissions. In this situation, some connection(s) between the set of expected SPS interval/offset included in the UE assistance information and the required SPS resource demands indicated in the SL BSR would be needed. Otherwise, the eNB could not schedule SPS resources properly, e.g., CAM-used SPS configuration may be activated with DENM-used SPS resources, and versa. This could be illustrated in FIG. 16.

There are two directions to consider for such connection.

Figure 17:
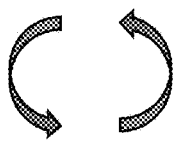
FIG. 17 is an illustration according to one exemplary embodiment.

Direction 1—In this direction, the UE indicates the need of SL SPS resources via SidelinkUEInformation instead of UE assistance information. Destination Layer2 ID and expected SPS configuration could be bound in the SidelinkUEInformation, as discussed in 3GPP TS 36.331. One drawback of this direction is that it could cause signaling overhead. For example, all of destination layer2 IDs and expected SPS configurations in the SidelinkUEInformation should be reported although only part of expected SPS configurations changes. In this direction, the SPS index could be optionally included in the SidelinkUEInformation. The concept of this direction could be illustrated in FIG. 17.

Figure 18:
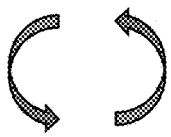
FIG. 18 is an illustration according to one exemplary embodiment.

Direction 2—This direction considers the association between destination index and expected SPS configuration. For example, if the expected SPS interval/timing offset is to be used for CAM transmission, then the destination index associated with the destination layer-2 ID of CAM could also be used to associate the expected SPS interval/timing offset with the required SPS resource demand in the SL BSR. In one embodiment, the destination index could be included in the UE assistance information. Compared with Direction 1, Direction 2 could reduce signaling overhead because the destination index (4 bits) has fewer bits than the destination ID (24 bits). The concept of this direction could be illustrated in FIG. 18.

According to ETSI EN 302 637-3, the construction of a DENM is triggered by an ITS-S application. It is possible that the ITS-S application would detect more than one event at a time. For example, automatic emergency braking is activated while emergency electronic brake lights (according to use cases in Table 10 of ETSI EN 302 637-3). If this is the case, the UE may detect two events and start to generate a sequent DENM1 messages and a sequent DENM2 messages for the corresponding events.

Figure 19:
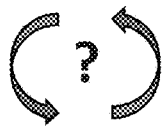
FIG. 19 is an illustration according to one exemplary embodiment.

In this case, the UE may trigger a UE assistance information for requesting two sets of SPS resources and a SL BSR for indicating SPS resource demands for transmitting these two sequent DENM messages. If the logical channel(s) carrying these two sequent DENM messages belongs to same LCG (due to, for example, priority rule provided by eNB), the eNB cannot differentiate correct resource demands for each sequent DENM messages based on the SL BSR because the resource demands are mixed together under same destination index (DENM) and same LCG. The issue could be illustrated in FIG. 19.

There are two alternatives to solve the issue.

Figure 20:
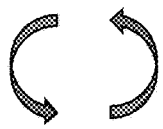
FIG. 20 is an illustration according to one exemplary embodiment.

Alternative 1—A possible solution is to specify more than one Destination Layer-2 ID used for DENM transmission purpose so that UE can select different Destination Layer-2 IDs for different sequent DENM messages, e.g., Destination Layer-2 ID2 is used for DENM1 and Destination Layer-2 ID3 is used for DENM2 in the SidelinkUEInformation. In this alternative, each set of expected SPS interval/timing offset included in the UE assistance information could be identified by the associated destination index and thus the SPS index could be optionally included in the UE assistance information. In this alternative, the network (or eNB) may schedule the UE with SPS resources via a downlink control information containing a destination index associated with a set of expected SPS interval/timing offset indicated in the UE assistance information so that the UE knows the set of expected SPS interval/timing offset to be activated and also the associated V2X message. The downlink control information may be transmitted on a PDCCH. The concept of this alternative could be illustrated in FIG. 20.

In an exemplary embodiment, after a UE generates a first V2X message associated with a first destination identity, the UE may transmit a first signal (e.g., sidelinkUEinformation) to a network node, wherein the first signal contains the first destination identity associated with a first destination index. The first destination identity is a destination layer-2 identity belonging to a PSID associated with the first V2X message.

The UE will also transmit a second signal (e.g., UE assistance information) to the network node for requesting a SPS resources for transmitting the first V2X message and following first V2X messages which are generated subsequent to the first V2X message, wherein the second signal contains a first SPS interval and the first destination index. The second signal could be a MAC signalling (e.g., MAC CE). The second signal could be a RRC message. The second signal could include a size of the first V2X message (e.g., TB size, message size, PDCP PDU size, RLC PDU size, etc.).

The UE may receive a fourth signal from the network node, wherein the fourth signal may contain first information indicating the SPS resources. Furthermore, the UE transmits the first V2X message and the following first V2X messages according to the SPS resources indicated by the first information. The fourth signal may be a downlink control information. The fourth signal may include the first destination index.

Figure 21:
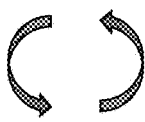
FIG. 21 is an illustration according to one exemplary embodiment.

Alternative 2—Buffer status for different sequent DENM messages could be reported in different LCGs. In this alternative, limited number of LCG could restrict the maximum number of sequent DENM messages for transmissions at a time. The rule of mapping between logical channel and LCG could be UE implementation. For example, three of total four LCGs could be used for SL SPS resource scheduling and the last one LCG could be used for dynamic scheduling. The concept of this alternative could be illustrated in FIG. 21.

The above alternatives could be used to request new SPS resources or to modify current SPS resources.

Figure 22:
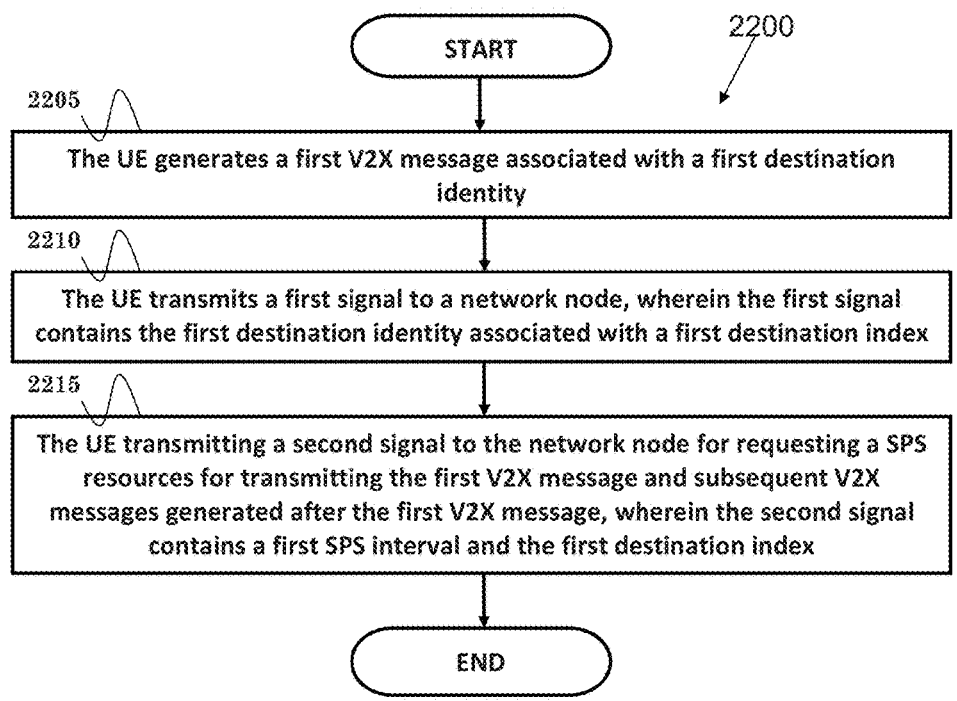
FIG. 22 is a flow chart according to one exemplary embodiment from the perspective of a UE.

FIG. 22 is a flow chart 2200 according to one exemplary embodiment from the perspective of a UE. In step 2205, the UE generates a first V2X message associated with a first destination identity. In step 2210, the UE transmits a first signal to a network node, wherein the first signal contains the first destination identity associated with a first destination index. In step 2215, the UE transmitting a second signal to the network node for requesting a SPS resources for transmitting the first V2X message and subsequent V2X messages generated after the first V2X message, wherein the second signal contains a first SPS interval and the first destination index. In one embodiment, the second signal contains a size of the first V2X message.

In one embodiment, the UE could transmit a third signal to the network node for reporting resource demand for transmitting the first V2X message, wherein the third signal contains the first destination index and a buffer size indicating the resource demand. Furthermore, the UE could receive a fourth signal from the network node, wherein the fourth signal contains first information indicating the SPS resources. In addition, the UE could transmit the first V2X message and the subsequent V2X messages according to the SPS resources indicated by the first information.

Referring back to FIGS. 3 and 4, in one exemplary embodiment of a UE, the device 300 includes a program code 312 stored in the memory 310. The CPU 308 could execute program code 312 to enable the UE (i) to generate a first V2X message associated with a first destination identity, (ii) to transmits a first signal to a network node, wherein the first signal contains the first destination identity associated with a first destination index, and (iii) to transmit a second signal to the network node for requesting a SPS resources for transmitting the first V2X message and subsequent V2X messages generated after the first V2X message, wherein the second signal contains a first SPS interval and the first destination index. Furthermore, the CPU 308 can execute the program code 312 to perform all of the above-described actions and steps or others described herein.

Figure 23:
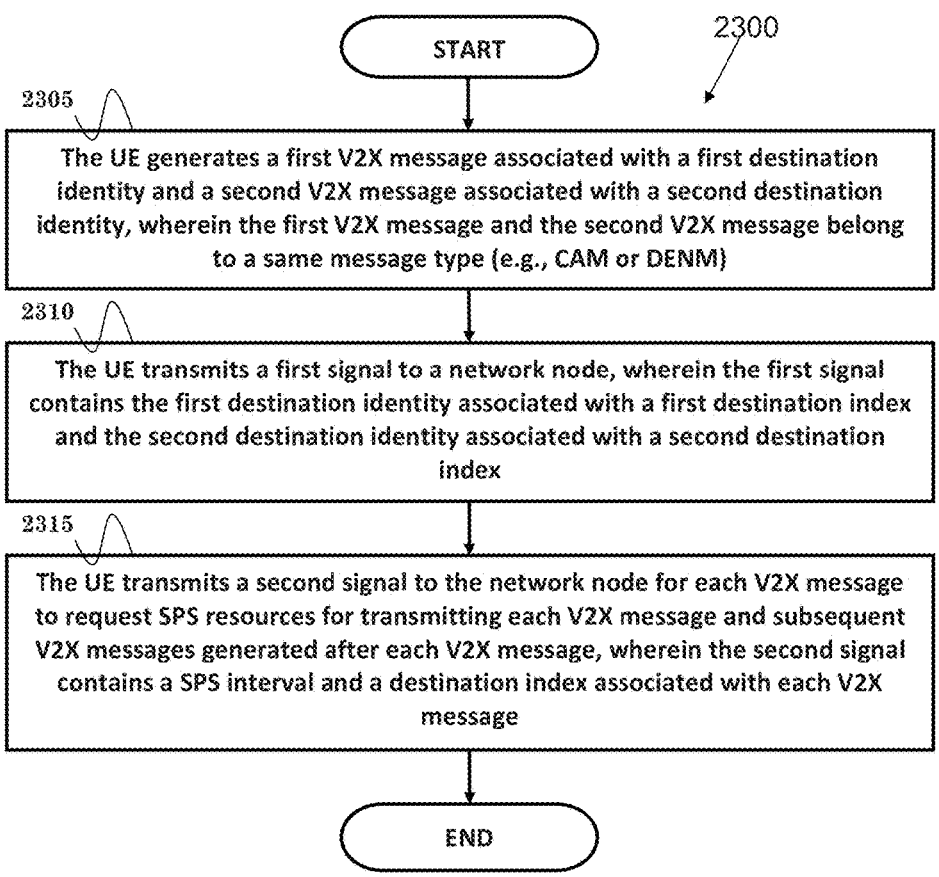
FIG. 23 is a flow chart according to one exemplary embodiment from the perspective of a UE.

FIG. 23 is a flow chart 2300 according to one exemplary embodiment from the perspective of a UE. In step 2305, the UE generates a first V2X message associated with a first destination identity and a second V2X message associated with a second destination identity, wherein the first V2X message and the second V2X message belong to a same message type (e.g., CAM or DENM). In step 2310, the UE transmits a first signal to a network node, wherein the first signal contains the first destination identity associated with a first destination index and the second destination identity associated with a second destination index. In step 2315, the UE transmits a second signal to the network node for each V2X message to request SPS resources for transmitting each V2X message and subsequent V2X messages generated after each V2X message, wherein the second signal contains a SPS interval and a destination index associated with each V2X message.

In one embodiment, the transmission of the second signal containing the first destination index and the transmission of the second signal containing the second destination index could occur on a same subframe or different subframes. Furthermore, the second signal could contain a size of the first V2X message and/or a size of the second V2X message.

In one embodiment, the UE could transmit a third signal to the network node for reporting a first buffer size of the first V2X message and a second buffer size of the second V2X message, wherein the third signal contains the first destination index, the first buffer size, the second destination index, and the second buffer size. In addition, the UE could receive a fourth signal from the network node, wherein the fourth signal contains first information indicating a first SPS resources and/or second information indicating a second SPS resources. In one embodiment, the reception of the fourth signal containing the first information and the reception of the fourth signal containing the second information could occur on a same subframe or different subframes.

In one embodiment, the UE could transmit the first V2X message and the following first V2X messages according to the first SPS resources indicated by the first information, and could transmit the second V2X message and subsequent V2X messages generated after the second V2X messages according to the second SPS resources indicated by the second information.

In one embodiment, the SPS interval could be a duration between two consecutive V2X messages. Furthermore, the first V2X messages and the subsequent V2X messages generated after the first V2X messages could be CAM messages or DENM messages.

In one embodiment, the first destination identity could be a destination layer-2 identity belonging to a PSID associated with the first V2X message. In addition, the second destination identity could a destination layer-2 identity belonging to a PSID associated with the second V2X message.

Referring back to FIGS. 3 and 4, in one exemplary embodiment of a UE, the device 300 includes a program code 312 stored in the memory 310. The CPU 308 could execute program code 312 to enable the UE (i) to generate a first V2X message associated with a first destination identity and a second V2X message associated with a second destination identity, wherein the first V2X message and the second V2X message belong to a same message type (e.g., CAM or DENM), (ii) to transmit a first signal to a network node, wherein the first signal contains the first destination identity associated with a first destination index and the second destination identity associated with a second destination index, and (iii) to transmits a second signal to the network node for each V2X message to request SPS resources for transmitting each V2X message and subsequent V2X messages generated after each V2X message, wherein the second signal contains a SPS interval and a destination index associated with each V2X message. Furthermore, the CPU 308 can execute the program code 312 to perform all of the above-described actions and steps or others described herein.

Figure 24:
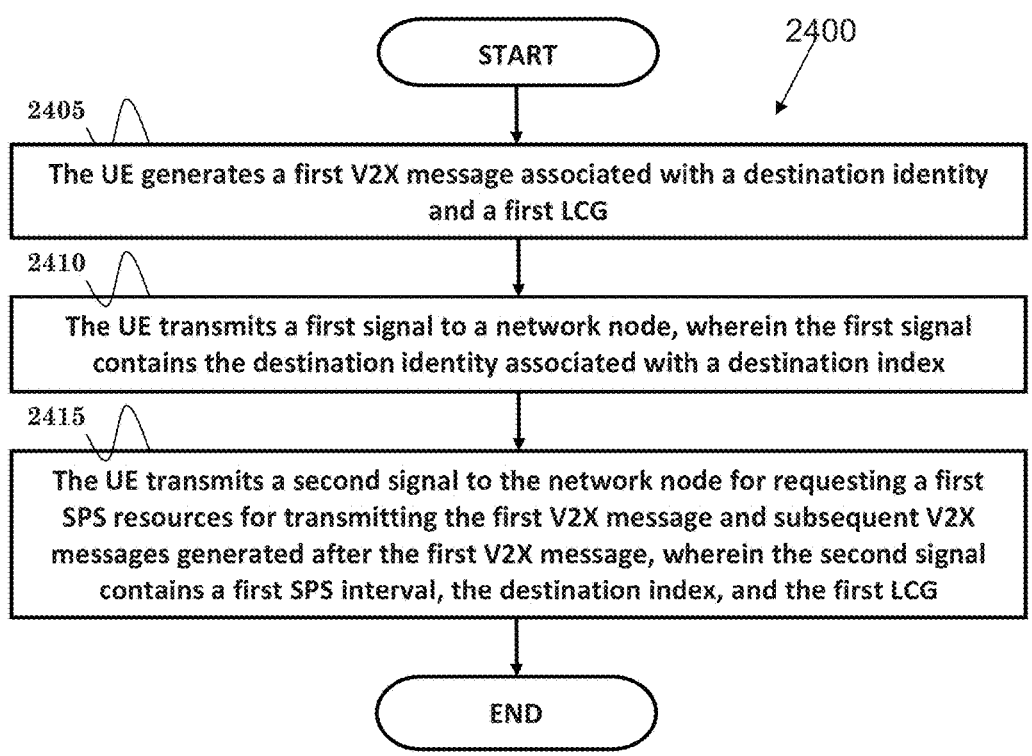
FIG. 24 is a flow chart according to one exemplary embodiment from the perspective of a UE.

FIG. 24 is a flow chart 2400 according to one exemplary embodiment from the perspective of a UE. In step 2405, the UE generates a first V2X message associated with a destination identity and a first LCG. In step 2410, the UE transmits a first signal to a network node, wherein the first signal contains the destination identity associated with a destination index. In step 2415, the UE transmits a second signal to the network node for requesting a first SPS resources for transmitting the first V2X message and subsequent V2X messages generated after the first V2X message, wherein the second signal contains a first SPS interval, the destination index, and the first LCG. In one embodiment, the second signal could contain a size of the first V2X message.

In one embodiment, the UE could transmit a third signal to the network node for reporting a buffer size of the first V2X message, wherein the third signal contains the first destination index, the first LCG, and the buffer size. In addition, the UE could receive a fourth signal from the network node, wherein the fourth signal contains first information indicating the first SPS resources. Furthermore, the UE could transmit the first V2X message and the subsequent V2X messages generated after the first V2X message according to the first SPS resources indicated by the first information.

In one embodiment, the first V2X message and the subsequent V2X messages generated after the first V2X message could be CAM messages or DENM messages. Furthermore, the destination identity could be a destination layer-2 identity belonging to a PSID associated with the first V2X message. In addition, the network node could be an eNB or a base station.

In one embodiment, the first signal could be a RRC signaling (e.g., SidelinkUEInformation). In addition, the second signal could be a MAC signaling (e.g., UE Assistance Information) or a RRC signaling (e.g., UE Assistance Information). Furthermore, the third signal could be a MAC signaling (e.g., Sidelink BSR). Also, the fourth signal could be a downlink control signaling, and could contain the destination index included in the second signal.

In one embodiment, the first and second information could be downlink control information.

Referring back to FIGS. 3 and 4, in one exemplary embodiment of a UE, the device 300 includes a program code 312 stored in the memory 310. The CPU 308 could execute program code 312 to enable the UE (i) to generate a first V2X message associated with a destination identity and a first LCG, (ii) to transmit a first signal to a network node, wherein the first signal contains the destination identity associated with a destination index, and (iii) to transmit a second signal to the network node for requesting a first SPS resources for transmitting the first V2X message and subsequent V2X messages generated after the first V2X message, wherein the second signal contains a first SPS interval, the destination index, and the first LCG. Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a UE (User Equipment) for requesting semi-persistent scheduling (SPS) resources for V2X (Vehicle-to-Everything) message transmissions in a wireless communication system, comprising:
    generating a first V2X message for transmission;
    transmitting a first signal to a network node for requesting SPS resources for transmitting the first V2X message and subsequent V2X messages which are generated subsequent to the first V2X message,
    wherein the UE assigns an identity used to associate the SPS resources with the first V2X message and the subsequent V2X messages, and the UE includes the identity in the first signal, and
    wherein the first signal contains traffic characteristics for the first V2X message and the subsequent V2X messages, and the traffic characteristics comprise at least one of periodicity, generation timing, or message size;
    receiving a second signal from the network node, wherein the second signal contains a first information indicating the SPS resources and the identity; and
    transmitting the first V2X message and the subsequent V2X messages according to the SPS resources indicated by the first information.

2. The method of claim 1, further comprising:
generating a second V2X message which causes a change to current SPS resources.

3. The method of claim 1, further comprising:
transmitting a third signal to the network node for modifying the current SPS resources, wherein the third signal contains at least the identity.

4. The method of claim 1, further comprising:
receiving a fourth signal from the network node, wherein the fourth signal contains a second information indicating updated SPS resources and the identity.

5. The method of claim 1, further comprising:
transmitting the second V2X message and following second V2X messages which are generated subsequent to the second V2X message according to the updated SPS resources indicated by the second information.

6. The method of claim 3, wherein the third signal contains traffic characteristics for the second V2X message and the following second V2X messages, and the traffic characteristics comprise at least one of periodicity, generation timing, or message size.

7. The method of claim 1, wherein the second signal is a SPS (Semi-Persistent Scheduling) initialization signaling.

8. The method of claim 4, wherein the fourth signal is a SPS (Semi-Peristent Scheduling) re-initialisation signaling.

9. The method of claim 1, wherein the identity is set by the UE and is an identity of the SPS (Semi-Persistent Scheduling) resources, and the SPS resources comprise at least one of SPS configuration ID or SPS grant ID.

10. A User Equipment (UE), comprising:
a control circuit;
a processor installed in the control circuit; and
a memory installed in the control circuit and operatively coupled to the processor;
wherein the processor is configured to execute a program code stored in the memory to:
generate a first V2X message for transmission;
transmit a first signal to a network node for requesting SPS resources for transmitting the first V2X message and subsequent V2X messages which are generated subsequent to the first V2X message,
wherein the UE assigns an identity used to associate the SPS resources with the first V2X message and the subsequent V2X messages, and the UE includes the identity in the first signal, and
wherein the first signal contains traffic characteristics for the first V2X message and the subsequent V2X messages, and the traffic characteristics comprise at least one of periodicity, generation timing, or message size;
receive a second signal from the network node, wherein the second signal contains a first information indicating the SPS resources and the identity; and
transmit the first V2X message and the subsequent V2X messages according to the SPS resources indicated by the first information.

11. The UE of claim 10, wherein the processor is further configured to execute a program code stored in the memory to:
generate a second V2X message which causes a change to current SPS resources.

12. The UE of claim 10, wherein the processor is further configured to execute a program code stored in the memory to:
transmit a third signal to the network node for modifying the current SPS resources, wherein the third signal contains at least the identity.

13. The UE of claim 10, wherein the processor is further configured to execute a program code stored in the memory to:
receive a fourth signal from the network node, wherein the fourth signal contains a second information indicating updated SPS resources and the identity.

14. The UE of claim 10, wherein the processor is further configured to execute a program code stored in the memory to:
transmit the second V2X message and following second V2X messages which are generated subsequent to the second V2X message according to the updated SPS resources indicated by the second information.

15. The UE of claim 12, wherein the third signal contains traffic characteristics for the second V2X message and the following second V2X messages, and the traffic characteristics comprise at least one of periodicity, generation timing, or message size.

16. The UE of claim 10, wherein the second signal is a SPS (Semi-Persistent Scheduling)initialization signaling.

17. The UE of claim 13, wherein the fourth signal is a SPS (Semi-Peristent Scheduling) re-initialisation signaling.

18. The UE of claim 10, wherein the identity is set by the UE and is an identity of the SPS (Semi-Persistent Scheduling) resources, and the SPS resources comprise at least one of SPS configuration ID or SPS grant ID.

* * * * *